(12) United States Patent
Yuan et al.

(10) Patent No.: US 11,019,536 B2
(45) Date of Patent: May 25, 2021

(54) COMMUNICATION METHOD AND APPARATUS

(71) Applicant: HUAWEI TECHNOLOGIES CO., LTD., Guangdong (CN)

(72) Inventors: Shitong Yuan, Chengdu (CN); Yalin Liu, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/728,879

(22) Filed: Dec. 27, 2019

(65) Prior Publication Data
US 2020/0137639 A1  Apr. 30, 2020

Related U.S. Application Data

(63) Continuation of application No. PCT/CN2018/093763, filed on Jun. 29, 2018.

(30) Foreign Application Priority Data

Jun. 30, 2017 (CN) .......................... 201710522936.4

(51) Int. Cl.
*H04W 36/00* (2009.01)
*H04W 76/30* (2018.01)
*H04W 36/08* (2009.01)

(52) U.S. Cl.
CPC ........ *H04W 36/0011* (2013.01); *H04W 36/08* (2013.01); *H04W 76/30* (2018.02)

(58) Field of Classification Search
CPC ............. H04W 36/08; H04W 36/0011; H04W 36/0022; H04W 76/30; H04W 76/32; H04W 76/34; H04W 76/38
See application file for complete search history.

(56) References Cited

U.S. PATENT DOCUMENTS

| 8,358,624 | B1 * | 1/2013 | Ghaus | H04W 36/0061 370/331 |
| 2010/0098028 | A1 * | 4/2010 | Wu | H04W 76/34 370/331 |

(Continued)

FOREIGN PATENT DOCUMENTS

WO   2017098442 A1   6/2017

OTHER PUBLICATIONS

TS 23.502, "Handling of PDU sessions at slice unavailability", Qualcomm, May 2017, 31 pages (Year: 2017).*

(Continued)

*Primary Examiner* — Quoc Thai N Vu
(74) *Attorney, Agent, or Firm* — Womble Bond Dickinson (US) LLP

(57) ABSTRACT

This application discloses a communication method and an apparatus. When a terminal device switches to a target cell or is connected to a new primary cell, by requesting a network device to release a session corresponding to a network slice that is not supported by the target cell or the new primary cell and to keep a session corresponding to a network slice that is supported by the target cell or the new primary cell, the session corresponding to the network slice that is not supported by the target cell or the new primary cell can be quickly released, and a network resource is saved while a session corresponding to a network slice supported by the target cell or the new primary cell is enabled to be continued.

8 Claims, 9 Drawing Sheets

(56) References Cited

U.S. PATENT DOCUMENTS

| | | | | |
|---|---|---|---|---|
| 2011/0122818 | A1* | 5/2011 | Dwyer | H04W 76/27 |
| | | | | 370/328 |
| 2017/0070892 | A1 | 3/2017 | Song et al. | |
| 2019/0028941 | A1* | 1/2019 | Zee | H04W 36/0066 |
| 2019/0191348 | A1* | 6/2019 | Futaki | H04W 36/14 |
| 2020/0187277 | A1* | 6/2020 | Lee | H04W 80/10 |

OTHER PUBLICATIONS

SA WG2 Meeting #121,S2-173106,:"TS 23.502: handling of PDU sessions at slice unavailability",Qualcomm Incorporated, May 15-19, 2017, Hangzhou, P.R. China,total 31 pages.

Ericsson:"RAN aspects of NW slicing in Stage 2 specifications",3GPP Draft; R3-171139, Mar. 25, 2017 (Mar. 25, 2017), XP051255516,total 9 pages.

Huawei,"Xn based mobility for slicing",3GPP TSG-RAN WG3 96 R3-171786,Hangzhou, China, May 15-19, 2017,total 3 pages.

SA WG2 Meeting #S2-121,S2-173292:"PDU Session maintenance during modification of the set of Network Slice(s)", Motorola Mobility, Lenovo, May 15-19, 2017, Hangzhou, P. R. China,total 3 pages.

3GPP TS 23.502, V0.4.0,"3rd Generation Partnership Project; Technical Specification Group Services and System Aspects; Procedures for the 5G System; Stage 2 (Release 15)", Jun. 2, 2017 (Jun. 2, 2017), pp. 1-126, XP051298344,total 126 pages.

Huawei,"Procedure of Xn based mobility for slicing",3GPP TSG-RAN WG3 Meeting #AH R3-172486,Qingdao, China, Jun. 27 29, 2017,total 3 pages.

\* cited by examiner

COMMUNICATION METHOD AND APPARATUS

CROSS-REFERENCE TO RELATED APPLICATIONS

This application is a continuation of International Application No. PCT/CN2018/093763, filed on Jun. 29, 2018, which claims priority to Chinese Patent Application No. 201710522936.4, filed on Jun. 30, 2017. The disclosures of the aforementioned applications are hereby incorporated by reference in their entireties.

TECHNICAL FIELD

This application relates to the field of communications technologies, and in particular, to a communication method and an apparatus.

BACKGROUND

A network slice ("slice" for short) is a combination of a network function and a resource that are needed to implement a particular service or some services, and can flexibly allocate and reallocate resources based on user requirements. It may be understood as satisfying a plurality of software-defined functions by using same hardware. However, network slices are separated from each other, and an error or a failure of one network slice does not affect communication of another network slice. Although a network slice can be used to support different services or subleased to different operators, the network slice is merely presented as some dedicated bearers (bearer) on an access network side and includes a fixed quality of service (QoS) parameter to ensure performance (such as bandwidth and latency). For a terminal device, if different applications need different slices for support, a session identifier (session ID) of a related protocol data unit (PDU) is assigned to data of the applications for transmission. After distinguishing the data, a base station sends the data to a core network by using different bearers.

The terminal device triggers a handover process or a connection release process when moving among different cells. However, network slices that can be supported by different cells may be different. FIG. 1 is a schematic diagram of a scenario in which a network slice is not supported by the target cell during handover. It is assumed that a cell A supports a service of a slice 1 and a service of a slice 2 and a terminal device also needs the services of the two slices. Assuming that a cell B supports the service of the slice 2 and a service of a slice 3, if a terminal device accesses the cell B, a part of the slice services is not supported. Assuming that the terminal device moves towards a cell C, because the cell C supports merely the service of the slice 3, the slice services that the user terminal originally needs are not supported.

In prior art, when moving to a cell that does not support a slice service, a terminal device is disconnected from a network, and the terminal device attempts to reselect a cell and reselects to register to a network. For example, the terminal device switches from the cell A to the cell B, so that the service of the slice 2 supported by the cell B is no longer interrupted. Alternatively, a core network is used to control cell handover. However, based on a relatively large latency during implementation because of a large quantity of network elements in the handover of the core network, it is difficult for this type of handover to satisfy the latency requirements of some services sensitive with latency interruptions and to quickly release sessions corresponding to slices that are not supported.

SUMMARY

This application provides a communication method and an apparatus, to quickly release, during cell handover, a session corresponding to a slice that is not supported and continue a session corresponding to a slice that is supported.

According to an aspect of this application, a communication method is provided, including: receiving, by a terminal device, a handover command from a source access network device, where the handover command includes an identifier of a target cell; sending, by the terminal device, a session release request to a network device, where the session release request is used to request to release a session performed by the terminal device on at least one network slice in a source cell, the at least one network slice is not supported by the target cell, and the session release request includes the identifier of the target cell; and receiving, by the terminal device, a session release request acknowledgement from the network device. In one embodiment, when the terminal device switches to the target cell, by requesting the network device to release a session corresponding to a network slice that is not supported by the target cell, the session corresponding to the network slice that is not supported can be quickly released, and a network resource is saved while a session corresponding to a network slice supported by the target cell is enabled to be continued.

In one embodiment, the session release request includes an identifier of the session performed on the at least one network slice, and one network slice corresponds to at least one session. In one embodiment, the terminal device includes, in the session release request, an identifier of a session on a slice that is requested to be released, so that the network device may release a corresponding session based on the identifier of the session.

In one embodiment, the handover command includes an indication of whether the target cell supports the network slice in the source cell, or the handover command includes a network slice identifier supported by the target cell, or the handover command includes a network slice identifier that is not supported by the target cell. In one embodiment, the source access network device indicates, to the terminal device by using the handover command, related information of a slice corresponding to a to-be-released session, and the terminal device sends the session release request to the network device based on the related information.

In one embodiment, after the receiving, by a terminal device, a handover command from a source access network device, the method further includes: starting, by the terminal device, a timer; and the sending, by the terminal device, a session release request to a network device includes: sending, by the terminal device when the timer expires, the session release request to the network device. In one embodiment, after the terminal device receives the handover command of the source access network device or switches to the target cell, the terminal device may send, based on slice availability of the target cell, the session release request to the network device after a period of time.

According to another aspect of this application, a communication method is provided, including: sending, by a source access network device, a handover command to a terminal device, where the handover command includes an identifier of a target cell, the handover command further includes an indication of whether the target cell supports a network slice in a source cell, or the handover command includes a network slice identifier supported by the target cell, or the handover command includes a network slice identifier that is not supported by the target cell. In one embodiment, in a handover process of the terminal device, by requesting the network device to release a session corresponding to a network slice that is not supported by the target cell, the session corresponding to the network slice that is not supported can be quickly released, and a network resource is saved while a session corresponding to a network slice supported by the target cell is enabled to be continued. Slice-related information about the target cell is notified by the source access network device.

According to still another aspect of this application, a communication method is provided, including: receiving, by a network device, a session release request from a terminal device, where the session release request is used to request to release a session performed by the terminal device on at least one network slice in a source cell, the at least one network slice is not supported by a target cell, and the session release request includes an identifier of the target cell; and sending, by the network device, a session release request acknowledgement to the terminal device. In one embodiment, in a handover process of the terminal device, after receiving the request of the terminal device to release a session corresponding to a network slice that is not supported by the target cell, the network device releases the corresponding session, so that the session corresponding to the network slice that is not supported is quickly released, and a network resource is saved while a session corresponding to a network slice supported by the target cell is enabled to be continued.

In one embodiment, the session release request includes an identifier of a session performed on the at least one network slice, and one network slice corresponds to at least one session; and before the sending, by the network device, a session release request acknowledgement to the terminal device, the method further includes: determining, by the network device, to release a session corresponding to the identifier of the session performed on the at least one network slice. In one embodiment, the terminal device includes, in the session release request, an identifier of a session on a slice that is requested to be released, so that the network device may release a corresponding session based on the identifier of the session.

In one embodiment, before the sending, by the network device, a session release request acknowledgement to the terminal device, the method further includes: comparing, by the network device based on the identifier of the target cell, a network slice supported by the source cell with a network slice supported by the target cell, to determine the at least one network slice that is not supported by the target cell; and determining, by the network device, to release the session performed on the at least one network slice. In one embodiment, the source access network device indicates, to the terminal device by using the handover command, related information of a slice corresponding to a to-be-released session, and the terminal device sends the session release request to the network device based on the related information. The network device determines, based on the related information of the slice and session information managed by the network device, the session that needs to be released.

According to still another aspect of this application, a communication method is provided, including: sending, by a terminal device after a first cell is switched into a secondary cell and a second cell is switched into a primary cell or after the terminal device receives a connection release command from the second cell, a session release request to a network device, where the session release request is used to request to release a session performed by the terminal device on at least one network slice in the first cell, the at least one network slice is not supported by the second cell, the session release request includes an identifier of the second cell, and the terminal device is connected to both the first cell and the second cell; and receiving, by the terminal device, a session release request acknowledgement from the network device. In one embodiment, when the terminal device is connected to a new primary cell, by requesting the network device to release a session corresponding to a network slice that is not supported by the new primary cell, the session corresponding to the network slice that is not supported can be quickly released, and a network resource is saved while a session corresponding to a network slice supported by the new primary cell is enabled to be continued.

In one embodiment, the sending, by a terminal device, a session release request to a network device includes: sending the session release request to an access and mobility management function (AMF) entity by using an access network device of the first cell; or sending the session release request to the AMF by using an access network device of the second cell, where the access network device of the first cell and the access network device of the second cell are connected to the same AMF; or sending the session release request to the access network device of the first cell by using the access network device of the second cell, where the access network device of the first cell and the access network device of the second cell are connected to different AMFs. In one embodiment, the session release request may be sent, based on whether the first cell and the second cell are connected to a same AMF, to the network device by the access network device of the first cell or the access network device of the second cell.

According to still another aspect of this application, a communication method is provided, including: receiving, by an access network device of a first cell, a session release request from a terminal device, where the session release request is used to request to release a session performed on at least one network slice in the first cell, the at least one network slice is not supported by a second cell, the session release request includes an identifier of the second cell, and the terminal device is connected to both the first cell and the second cell; and sending, by the access network device of the first cell, the session release request of the terminal device to an access and mobility management function (AMF) entity. In one embodiment, the terminal device sends the session release request to an original primary cell, and an access network device of the original primary cell sends the session release request to a network device. By requesting the network device to release a session corresponding to a network slice that is not supported by the new primary cell, the session corresponding to the network slice that is not supported can be quickly released, and a network resource is saved while a session corresponding to a network slice supported by the new primary cell is enabled to be continued.

According to still another aspect of this application, a communication method is provided, including: receiving, by an access network device of a first cell, a session release request that is from a terminal device and forwarded by an access network device of a second cell, where the session release request is used to request to release a session performed by the terminal device on at least one network slice in the first cell, the at least one network slice is not supported by a second cell, the session release request includes an identifier of the second cell, and the terminal device is connected to both the first cell and the second cell; and sending, by the access network device of the first cell, the session release request to an access and mobility management function (AMF) entity. The access network device of the first cell and the access network device of the second cell are connected to different AMFs. In one embodiment, the terminal device sends the session release request to a new primary cell. Because the new primary cell and an original primary cell are connected to different AMFs, the new primary cell forwards the session release request to the original primary cell, and an access network device of the original primary cell sends the session release request to a network device. By requesting the network device to release a session corresponding to a network slice that is not supported by the new primary cell, the session corresponding to the network slice that is not supported can be quickly released, and a network resource is saved while a session corresponding to a network slice supported by the new primary cell is enabled to be continued.

According to still another aspect of this application, a communication method is provided, including: receiving, by a network device, a session release request from a terminal device, where the session release request is used to request to release a session performed by the terminal device on at least one network slice in a first cell, the session release request includes an identifier of a second cell, and the terminal device is connected to both the first cell and the second cell; and sending, by the network device, a session release request acknowledgement to the terminal device. In one embodiment, when the terminal device is connected to a new primary cell, by requesting the network device to release a session corresponding to a network slice that is not supported by the new primary cell, the session corresponding to the network slice that is not supported can be quickly released, and a network resource is saved while a session corresponding to a network slice supported by the new primary cell is enabled to be continued.

In one embodiment, before the sending, by the network device, a session release request acknowledgement to the terminal device, the method further includes: comparing, by the network device based on the identifier of the second cell, a network slice supported by the first cell with a network slice supported by the second cell, to determine the at least one network slice that is supported by the first cell and not supported by the second cell; and determining, by the network device, to release the session performed on the at least one network slice. In one embodiment, the network device determines the released session.

In one embodiment, the session release request and the session release request acknowledgement are included in a radio resource control (RRC) message, and the RRC message further includes a session release reason. In one embodiment, by carrying the release reason, the reason is used to indicate that a PDU session is released because a target cell slice is unavailable. The reason may affect a subsequent terminal device behavior. For example, when reselecting a cell, the terminal device avoids the target cell, or the reason is used by an operator for later network maintenance and optimization.

According to still another aspect of this application, a communication method is provided, including: sending, by a source access network device, a message to a network device, where the message is used to indicate that a terminal device is switching to a target cell in which at least one network slice is not supported, and the message includes an identifier of the target cell; and sending, by the source access network device, a handover command to the terminal device, where the handover command includes the identifier of the target cell. In one embodiment, the source access network device sends an indication message to the network device to indicate that the terminal device is switching to a target cell in which all/some of network slices are not supported. The network device instructs, based on the indication message, the terminal device to release sessions performed on all/some of the network slices, to quickly release a session corresponding to a network slice that is not supported and save a network resource while enabling a session corresponding to a network slice supported by the target cell or a new primary cell to be continued.

In one embodiment, the message further includes network slice information, and the network slice information includes at least one of the following information: a network slice identifier and network slice selection assistance information.

According to still another aspect of this application, a communication method is provided, including: receiving, by a network device, a message from a source access network device, where the message is used to indicate that a terminal device is switching to a target cell in which at least one network slice is not supported, and the message includes an identifier of the target cell; and sending, by the network device, a session release command to the terminal device, where the session release command is used to instruct the terminal device to release a session performed on the at least one network slice. In one embodiment, the source access network device sends an indication message to the network device to indicate that the terminal device is switching to a target cell in which all/some of network slices are not supported. The network device instructs, based on the indication message, the terminal device to release sessions performed on all/some of the network slices, to quickly release a session corresponding to a network slice that is not supported and save a network resource while enabling a session corresponding to a network slice supported by the target cell or a new primary cell to be continued.

In one embodiment, before the sending, by the network device, a session release command to the terminal device, the method further includes: comparing, by the network device based on the identifier of the target cell, a network slice supported by the source cell with a network slice supported by the target cell, to determine the at least one network slice that is supported by the source cell and is not supported by the target cell; and determining, by the network device, to release the session performed on the at least one network slice.

In one embodiment, the message further includes network slice information, and the network slice information includes at least one of the following information: a network slice identifier and network slice selection assistance information.

In one embodiment, the session release command is included in a radio resource control (RRC) message, and the RRC message further includes a session release reason.

According to still another aspect of this application, a communication method is provided, including: receiving, by a terminal device, a handover command from a source access network device, where the handover command includes an identifier of a target cell; and receiving, by the terminal device, a session release command from a network device, where the session release command is used to instruct the terminal device to release a session performed on at least one network slice, and the at least one network slice is a network slice that is supported by a source cell and not supported by the target cell. In one embodiment, the source access network device sends an indication message to the network device to indicate that the terminal device is switching to a target cell in which all/some of network slices are not supported. The network device instructs, based on the indication message, the terminal device to release sessions performed on all/some of the network slices, to quickly release a session corresponding to a network slice that is not supported and save a network resource while enabling a session corresponding to a network slice supported by the target cell or a new primary cell to be continued.

According to still another aspect of this application, a communication method is provided, including: sending, by a terminal device, a radio resource control (RRC) connection release request to an access network device, where the RRC connection release request includes a session release request, the session release request is used to request a network device to release a session performed on at least one network slice in a source cell, the at least one network slice is not supported by a target cell, and the session release request includes an identifier of the target cell; and receiving, by the terminal device, an RRC connection release command from the access network device, where the RRC connection release command includes a session release request acknowledgement from the network device. The RRC connection release request and/or the RRC connection release command include/includes a session release reason. In one embodiment, a release reason is added to an RRC message of interaction between the terminal device and the access network device during handover, and the reason is used to indicate that a PDU session is released because a target cell slice is unavailable. The reason may affect a subsequent terminal device behavior. For example, when reselecting a cell, the terminal device avoids the target cell, or the reason is used by an operator for later network maintenance and optimization.

In one embodiment, the method further includes: receiving, by the terminal device, an RRC connection reconfiguration command from the access network device, where the RRC connection reconfiguration command includes the session release reason.

According to still another aspect of this application, a communication method is provided, including: receiving, by an access network device, a radio resource control (RRC) connection release request from a terminal device, where the RRC connection release request includes a session release request, the session release request is used to request a network device to release a session performed on at least one network slice in a source cell, the at least one network slice is not supported by a target cell, and the session release request includes an identifier of the target cell; and sending, by the access network device, an RRC connection release command to the terminal device, where the RRC connection release command includes a session release request acknowledgement from the network device, and the RRC connection release request and/or the RRC connection release command include/includes a session release reason.

In one embodiment, the method further includes: sending, by the access network device, an RRC connection reconfiguration command to the terminal device, where the RRC connection reconfiguration command includes the session release reason.

With reference to the foregoing aspects, in one embodiment, the session release request further includes an identifier of the session performed on the at least one network slice, and/or an identifier of the at least one network slice.

Correspondingly, this application further provides a terminal device. The terminal device may implement the foregoing communication method. For example, the terminal device may be a chip (such as a baseband chip or a communications chip) or a sending device (such as a terminal device). The foregoing method may be implemented by using software, hardware, or hardware executing corresponding software.

In one embodiment, a structure of the terminal device includes a processor and a memory. The processor is configured to support the apparatus in performing a corresponding function in the foregoing communication method. The memory is configured to couple to the processor, and the memory stores a program (instruction) and/or data of the apparatus. In one embodiment, the terminal device may further include a communications interface configured to support the apparatus in communicating with another network element.

In one embodiment, the terminal device may include: a receiving unit, configured to receive a handover command from a source access network device, where the handover command includes an identifier of a target cell; and a sending unit, configured to send a session release request to a network device, where the session release request is used to request to release a session performed by the terminal device on at least one network slice in a source cell, the at least one network slice is not supported by the target cell, and the session release request includes the identifier of the target cell, where the receiving unit is further configured to receive a session release request acknowledgement from the network device.

Further, the terminal device further includes a timing unit, configured to start a timer, where the sending unit is configured to send, when the timer expires, the session release request to the network device.

Correspondingly, this application further provides an access network device. The access network device may implement the foregoing communication method. For example, the access network device may be a chip (such as a baseband chip or a communications chip) or a sending device (such as an access network device or a baseband processing board). The foregoing method may be implemented by using software, hardware, or hardware executing corresponding software.

In one embodiment, a structure of the access network device includes a processor and a memory. The processor is configured to support the apparatus in performing a corresponding function in the foregoing communication method. The memory is configured to couple to the processor, and the memory stores a program (instruction) and/or data of the apparatus. In one embodiment, the access network device may further include a communications interface configured to support the apparatus in communicating with another network element.

In one embodiment, the access network device may include: a sending unit, configured to send a handover command to a terminal device, where the handover command includes an identifier of a target cell, the handover command further includes an indication of whether the target cell supports a network slice in a source cell, or the handover command includes a network slice identifier supported by the target cell, or the handover command includes a network slice identifier that is not supported by the target cell.

According to another aspect, a network device is provided. The network device has a function of implementing behaviors of the network device in the foregoing methods.

The function may be implemented by hardware, or may be implemented by executing corresponding software by hardware. The hardware or the software includes one or more modules corresponding to the foregoing functions.

In one embodiment, the network device may include: a receiving unit, configured to receive a session release request from a terminal device, where the session release request is used to request to release a session performed by the terminal device on at least one network slice in a source cell, the at least one network slice is not supported by a target cell, and the session release request includes an identifier of the target cell; and a sending unit, configured to send the session release request acknowledgement to the terminal device.

Further, the session release request includes an identifier of the session performed on the at least one network slice; and one network slice corresponds to at least one session; and the network device further includes: a first determining unit, configured to determine to release a session corresponding to the identifier of the session performed on the at least one network slice.

Further, the network device further includes a second determining unit, configured to, compare, based on the identifier of the target cell, a network slice supported by the source cell with a network slice supported by the target cell, to determine the at least one network slice that is not supported by the target cell, and determine to release the session performed on the at least one network slice.

In one embodiment, the network device includes: a receiver, a transmitter, a memory and a processor. The memory stores a set of program code, and the processor is configured to invoke the program code stored in the memory, to perform the following operations: receiving, by the receiver, a session release request from a terminal device, where the session release request is used to request to release a session performed by the terminal device on at least one network slice in a source cell, the at least one network slice is not supported by a target cell, and the session release request includes an identifier of the target cell; and sending, by the transmitter, the session release request acknowledgement to the terminal device.

Based on a same inventive concept, for a principle for resolving the problem and beneficial effects of the apparatus, refer to the foregoing possible method implementations of the network device and their beneficial effects. Therefore, for implementation of the apparatus, refer to the implementation of the method, and repetitions are not described herein again.

Correspondingly, this application further provides a terminal device. The terminal device may implement the foregoing communication method. For example, the terminal device may be a chip (such as a baseband chip or a communications chip) or a sending device (such as a terminal device). The foregoing method may be implemented by using software, hardware, or hardware executing corresponding software.

In one embodiment, a structure of the terminal device includes a processor and a memory. The processor is configured to support the apparatus in performing a corresponding function in the foregoing communication method. The memory is configured to couple to the processor, and the memory stores a program (instruction) and/or data of the apparatus. In one embodiment, the terminal device may further include a communications interface configured to support the apparatus in communicating with another network element.

In one embodiment, the terminal device may include: a sending unit, configured to send, after a first cell is switched into a secondary cell and a second cell is switched into a primary cell or after the terminal device receives a connection release command from the second cell, a session release request to a network device, where the session release request is used to request to release a session performed by the terminal device on at least one network slice in the first cell, the at least one network slice is not supported by the second cell, the session release request includes an identifier of the second cell, and the terminal device is connected to both the first cell and the second cell; and a receiving unit, configured to receive a session release request acknowledgement from the network device.

Further, the sending unit is configured to: send the session release request to an access and mobility management function (AMF) entity by using an access network device of the first cell; or send the session release request to the AMF by using an access network device of the second cell, where the access network device of the first cell and the access network device of the second cell are connected to the same AMF; or send the session release request to the access network device of the first cell by using the access network device of the second cell, where the access network device of the first cell and the access network device of the second cell are connected to different AMFs.

Correspondingly, this application further provides an access network device. The access network device may implement the foregoing communication method. For example, the access network device may be a chip (such as a baseband chip or a communications chip) or a sending device (such as an access network device or a baseband processing board). The foregoing method may be implemented by using software, hardware, or hardware executing corresponding software.

In one embodiment, a structure of the access network device includes a processor and a memory. The processor is configured to support the apparatus in performing a corresponding function in the foregoing communication method. The memory is configured to couple to the processor, and the memory stores a program (instruction) and/or data of the apparatus. In one embodiment, the access network device may further include a communications interface configured to support the apparatus in communicating with another network element.

In one embodiment, the access network device may include: a receiving unit, configured to receive a session release request from a terminal device, where the session release request is used to request to release a session performed on at least one network slice in a first cell, the at least one network slice is not supported by a second cell, the session release request includes an identifier of the second cell, and the terminal device is connected to both the first cell and the second cell; and a sending unit, configured to send the session release request of the terminal device to an access and mobility management function (AMF) entity.

Correspondingly, this application further provides an access network device. The access network device may implement the foregoing communication method. For example, the access network device may be a chip (such as a baseband chip or a communications chip) or a sending device (such as an access network device or a baseband processing board). The foregoing method may be implemented by using software, hardware, or hardware executing corresponding software.

In one embodiment, a structure of the access network device includes a processor and a memory. The processor is configured to support the apparatus in performing a corresponding function in the foregoing communication method. The memory is configured to couple to the processor, and the memory stores a program (instruction) and/or data of the apparatus. In one embodiment, the access network device may further include a communications interface configured to support the apparatus in communicating with another network element.

In one embodiment, the access network device may include: a receiving unit, configured to receive a session release request that is from a terminal device and forwarded by an access network device of a second cell, where the session release request is used to request to release a session performed by the terminal device on at least one network slice in the first cell, the at least one network slice is not supported by the second cell, the session release request includes an identifier of the second cell, and the terminal device is connected to both the first cell and the second cell; and a sending unit, configured to send the session release request to an access and mobility management function (AMF) entity, where an access network device of the first cell and the access network device of the second cell are connected to different AMFs.

According to another aspect, a network device is provided. The network device has a function of implementing behaviors of the network device in the foregoing method. The function may be implemented by hardware, or may be implemented by executing corresponding software by hardware. The hardware or the software includes one or more modules corresponding to the foregoing functions.

In one embodiment, the network device includes: a receiving unit, configured to receive a session release request from a terminal device, where the session release request is used to request to release a session performed by the terminal device on at least one network slice in a first cell, the session release request includes an identifier of a second cell, and the terminal device is connected to both the first cell and the second cell; and a sending unit, configured to send a session release request acknowledgement to the terminal device.

Further, the network device further includes a determining unit, where the determining unit is configured to: compare, based on the identifier of the second cell, a network slice supported by the first cell with a network slice supported by the second cell, to determine the at least one network slice that is supported by the first cell and is not supported by the second cell, and determine to release the session performed on the at least one network slice.

In one embodiment, the network device may include: a receiver, a transmitter, a memory and a processor. The memory stores a set of program code, and the processor is configured to invoke the program code stored in the memory, to perform the following operations: receiving, by the receiver, a session release request from a terminal device, where the session release request is used to request to release a session performed by the terminal device on at least one network slice in the first cell, the session release request includes an identifier of the second cell, and the terminal device is connected to both the first cell and the second cell; and sending, by the transmitter, a session release request acknowledgement to the terminal device.

Based on a same inventive concept, for a principle for resolving the problem and beneficial effects of the apparatus, refer to the foregoing possible method implementations of the network device and their beneficial effects. Therefore, for implementation of the apparatus, refer to the implementation of the method, and repetitions are not described herein again.

Correspondingly, this application further provides an access network device. The access network device may implement the foregoing communication method. For example, the access network device may be a chip (such as a baseband chip or a communications chip) or a sending device (such as an access network device or a baseband processing board). The foregoing method may be implemented by using software, hardware, or hardware executing corresponding software.

In one embodiment, a structure of the access network device includes a processor and a memory. The processor is configured to support the apparatus in performing a corresponding function in the foregoing communication method. The memory is configured to couple to the processor, and the memory stores a program (instruction) and/or data of the apparatus. In one embodiment, the access network device may further include a communications interface configured to support the apparatus in communicating with another network element.

In one embodiment, the access network device may include a sending unit, configured to send a message to a network device, where the message is used to indicate that a terminal device is switching to a target cell in which at least one network slice is not supported, and the message includes an identifier of the target cell. The sending unit is further configured to send a handover command to the terminal device, where the handover command includes the identifier of the target cell.

According to another aspect, a network device is provided. The network device has a function of implementing behaviors of the network device in the foregoing method. The function may be implemented by hardware, or may be implemented by executing corresponding software by hardware. The hardware or the software includes one or more modules corresponding to the foregoing functions.

In one embodiment, the network device includes: a receiving unit, configured to receive a message from a source access network device, where the message is used to indicate that a terminal device is switching to a target cell in which at least one network slice is not supported, and the message includes an identifier of the target cell; and a sending unit, configured to send a session release command to the terminal device, where the session release command is used to instruct the terminal device to release a session performed on the at least one network slice.

In one embodiment, the network device further includes: a determining unit, where the determining unit is configured to: compare, based on the identifier of the target cell, a network slice supported by a source cell with a network slice supported by the target cell, to determine the at least one network slice that is supported by the source cell and is not supported by the target cell, and determine to release the session performed on the at least one network slice.

In one embodiment, the network device includes: a receiver, a transmitter, a memory and a processor. The memory is configured to store a set of program code, and the processor is configured to invoke the program code stored in the memory, to perform the following operations: receiving, by the receiver, a message from a source access network device, where the message is used to indicate that a terminal device is switching to a target cell in which at least one network slice is not supported, and the message includes an identifier of the target cell; and sending, by the transmitter, a session release command to the terminal device, where the session release command is used to instruct the terminal device to release a session performed on the at least one network slice.

Based on a same inventive concept, for a principle for resolving the problem and beneficial effects of the apparatus, refer to the foregoing possible method implementations of the network device and their beneficial effects. Therefore, for implementation of the apparatus, refer to the implementation of the method, and repetitions are not described herein again.

Correspondingly, this application further provides a terminal device. The terminal device may implement the foregoing communication method. For example, the terminal device may be a chip (such as a baseband chip or a communications chip) or a sending device (such as a terminal device). The foregoing method may be implemented by using software, hardware, or hardware executing corresponding software.

In one embodiment, a structure of the terminal device includes a processor and a memory. The processor is configured to support the apparatus in performing a corresponding function in the foregoing communication method. The memory is configured to couple to the processor, and the memory stores a program (instruction) and/or data of the apparatus. In one embodiment, the terminal device may further include a communications interface configured to support the apparatus in communicating with another network element.

In one embodiment, the terminal device may include a receiving unit, configured to receive a handover command from a source access network device, where the handover command includes an identifier of the target cell. The receiving unit is further configured to receive a session release command from a network device, where the session release command is used to instruct the terminal device to release a session performed on at least one network slice, and the at least one network slice is a network slice that is supported by a source cell and not supported by the target cell.

Correspondingly, this application further provides a terminal device. The terminal device may implement the foregoing communication method. For example, the terminal device may be a chip (such as a baseband chip or a communications chip) or a sending device (such as a terminal device). The foregoing method may be implemented by using software, hardware, or hardware executing corresponding software.

In one embodiment, a structure of the terminal device includes a processor and a memory. The processor is configured to support the apparatus in performing a corresponding function in the foregoing communication method. The memory is configured to couple to the processor, and the memory stores a program (instruction) and/or data of the apparatus. In one embodiment, the terminal device may further include a communications interface configured to support the apparatus in communicating with another network element.

In one embodiment, the terminal device may include: a sending unit, configured to send a radio resource control (RRC) connection release request to an access network device, where the RRC connection release request includes a session release request, the session release request is used to request a network device to release a session performed on at least one network slice in a source cell, the at least one network slice is not supported by a target cell, and the session release request includes an identifier of the target cell; and a receiving unit, configured to receive an RRC connection release command from the access network device, where the RRC connection release command includes a session release request acknowledgement from the network device, where the RRC connection release request and/or the RRC connection release command include/includes a session release reason.

Further, the receiving unit is further configured to receive an RRC connection reconfiguration command from the access network device, and the RRC connection reconfiguration command includes the session release reason.

Correspondingly, this application further provides an access network device. The access network device may implement the foregoing communication method. For example, the access network device may be a chip (such as a baseband chip or a communications chip) or a sending device (such as an access network device or a baseband processing board). The foregoing method may be implemented by using software, hardware, or hardware executing corresponding software.

In one embodiment, a structure of the access network device includes a processor and a memory. The processor is configured to support the apparatus in performing a corresponding function in the foregoing communication method. The memory is configured to couple to the processor, and the memory stores a program (instruction) and/or data of the apparatus. In one embodiment, the access network device may further include a communications interface configured to support the apparatus in communicating with another network element.

In one embodiment, the access network device may include: a receiving unit, configured to receive a radio resource control (RRC) connection release request from a terminal device, where the RRC connection release request includes a session release request, the session release request is used to request a network device to release a session performed on at least one network slice in a source cell, the at least one network slice is not supported by a target cell, and the session release request includes an identifier of the target cell; and a sending unit, configured to send an RRC connection release command to the terminal device, where the RRC connection release command includes a session release request acknowledgement from the network device, and the RRC connection release request and/or the RRC connection release command include/includes a session release reason.

In one embodiment, the sending unit is further configured to send an RRC connection reconfiguration command to the terminal device, where the RRC connection reconfiguration command includes the session release reason.

Another aspect of this application provides a computer readable storage medium. The computer readable storage medium stores an instruction, and when the instruction is run on a computer, the computer is enabled to perform the methods according to the foregoing aspects.

Another aspect of this application provides a computer program product including an instruction, and when the computer program product is run on a computer, the computer is enabled to perform the methods according to the foregoing aspects.

BRIEF DESCRIPTION OF DRAWINGS

To describe the technical solutions in the embodiments of the present application or in the background more clearly, the following describes the accompanying drawings required for describing the embodiments of the present application or the background.

DESCRIPTION OF EMBODIMENTS

The following describes embodiments of the present application with reference to the accompanying drawings in the embodiments of the present application.

Figure 1:
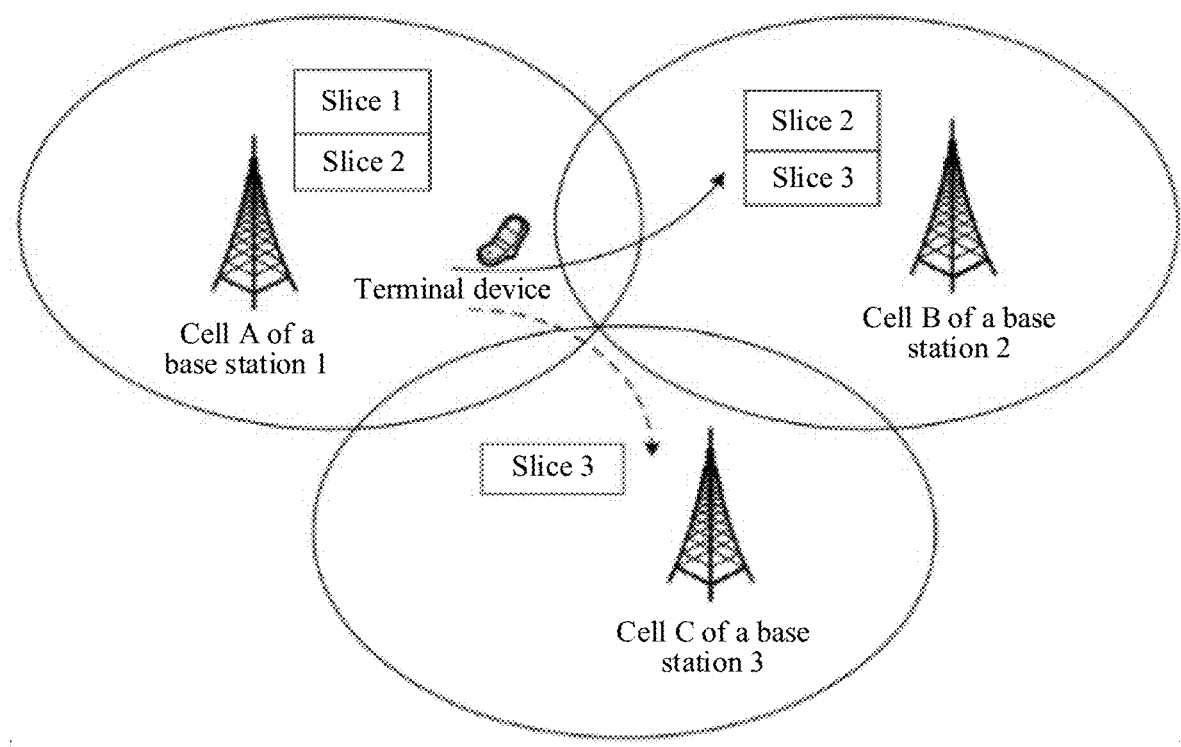
FIG. 1 is a schematic diagram of an example of a scenario in which a network slice is not supported in a target cell during handover.
Figure 2:
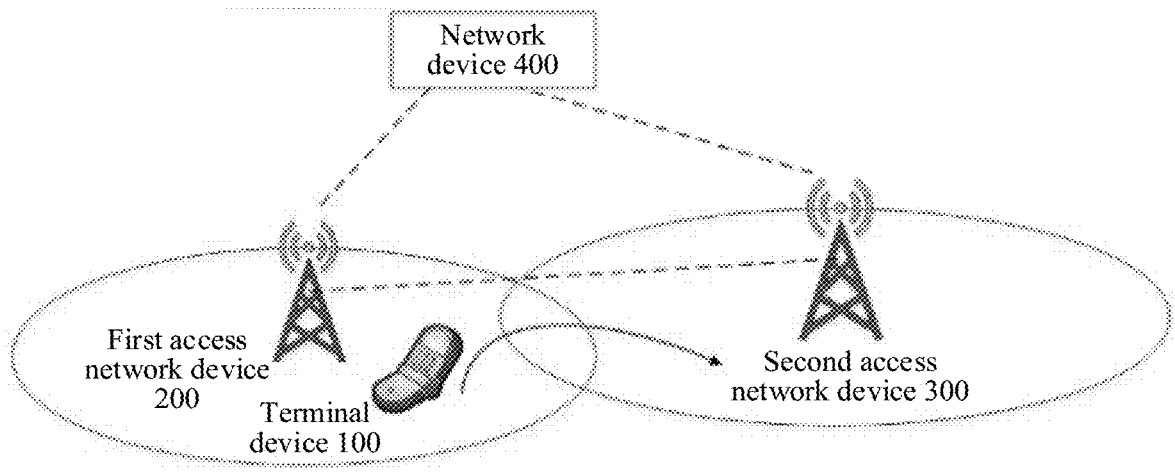
FIG. 2 is a schematic architectural diagram of a communications system according to an embodiment of the present application.

FIG. 2 is a schematic architectural diagram of a communications system according to an embodiment of the present application. The communications system in this embodiment of the present application mainly includes: a terminal device 100, a first access network device 200, a second access network device 300 and a network device 400. The communications system of this embodiment of the present application may include more terminal devices and access network devices. In a scenario of this embodiment of the present application, the terminal device 100 moves from a source cell covered by the first access network device 200 to a target cell covered by the second access network device 300. The terminal device may access a radio access network in an access mode of the third generation partnership project (3GPP), or in an access mode of non-3GPP (N3G). In the access mode of 3GPP, the access network device in FIG. 2 is referred to as a radio access network (RAN) element; and in the access mode of N3G, the access network device is referred to as an access network (AN) network element or a non-3GPP interworking function (N3IWF) network element. The access network device includes: a NodeB, a radio network controller (RNC) and the like. In this embodiment of the present application, an example in which the access network device is a base station is used for description.

Figure 3:
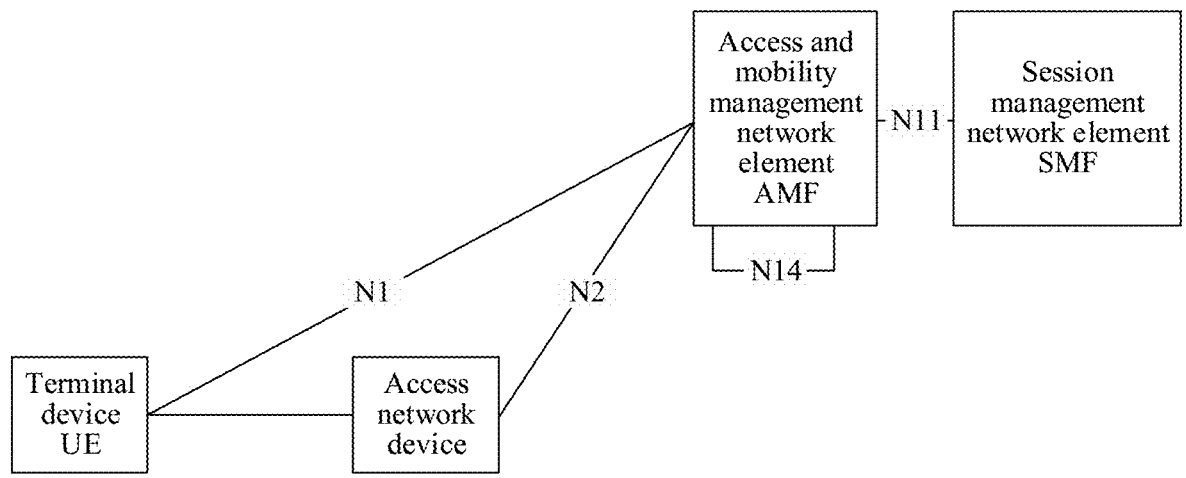
FIG. 3 is a schematic architectural diagram of an example of a next generation communications system according to an embodiment of the present application.

A next generation communications system is used as an example. FIG. 3 is a schematic architectural diagram of an example of a next generation communications system according to an embodiment of the present application. The network device in FIG. 2 is a core network device (certainly, with the evolution of a network architecture, an access network and a core network may not be distinguished from each other). A network device of this embodiment mainly includes the access and mobility management function (AMF) entity and the session management function (SMF) entity in FIG. 3. A terminal device accesses a network through an access network device, the AMF is mainly responsible of access management of the terminal device, and the session management function entity is responsible of uniform session management. In FIG. 3, another function entity may also be included, and some function entities in this application are merely focused on for description. The entities are connected to each other by using Nx interfaces (for example, the N1 and the N2 in the diagram).

It should be noted that access and mobility management function entity and session management function entity are merely names, and the names do not constitute a limitation to the entities. For example, the access and mobility management function entity may be replaced with "access and mobility management function-" or another name. In addition, the access and mobility management function entity may correspond to an entity including another function in addition to access and mobility management function. The session management function entity may be replaced with "session management function" or another name. In addition, the session management function entity may further correspond to an entity including another function in addition to a session management function. Unified description is made herein, and it is not described again hereinafter. A person of ordinary skill in the art may learn that related functions or names of the AMF and the SMF may change with the evolution of a network architecture and the emergence of a new service scenario.

Any function node or network element in the foregoing system may be implemented by a physical device during implementation, or may be implemented by a plurality of physical devices, and this is not limited in the embodiments of the present application. That is, it may be understood that any function node or network element in the system may be a logical function module in a physical device, or may be a logical function module including a plurality of physical devices. This is not limited in the embodiments of the present application.

The terminal device in this application is a device having a wireless receiving and sending function. The device may be deployed on the land, including an indoor or outdoor device, a handheld device, a wearable device, or an in-vehicle device; or may be deployed on the water (for example, on a steamer); or may be deployed in the air (for example, on an air plane, a balloon, or a satellite). The terminal device may be a mobile phone, a tablet computer, a computer having a wireless receiving and sending function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in this embodiment of this application. The terminal device may also be referred to as user equipment (UE), an access terminal device, a UE unit, a UE station, a mobile station, a mobile console, a remote station, a remote terminal device, a mobile device, a UE terminal device, a terminal device, a wireless communications device, a UE agent, a UE apparatus, or the like sometimes.

It should be noted that the terms "system" and "network" may be used interchangeably in the embodiments of the present application. The term "a plurality of" means two or more than two. In view of this, the term "a plurality of" may also be understood as "at least two" in the embodiments of the present application. The term "and/or" describes an association relationship between associated objects and represents that three relationships may exist. For example, A and/or B may represent the following three cases: Only A exists, both A and B exist, and only B exists. In addition, the character "/" generally indicates an "or" relationship between the associated objects.

Figure 4:
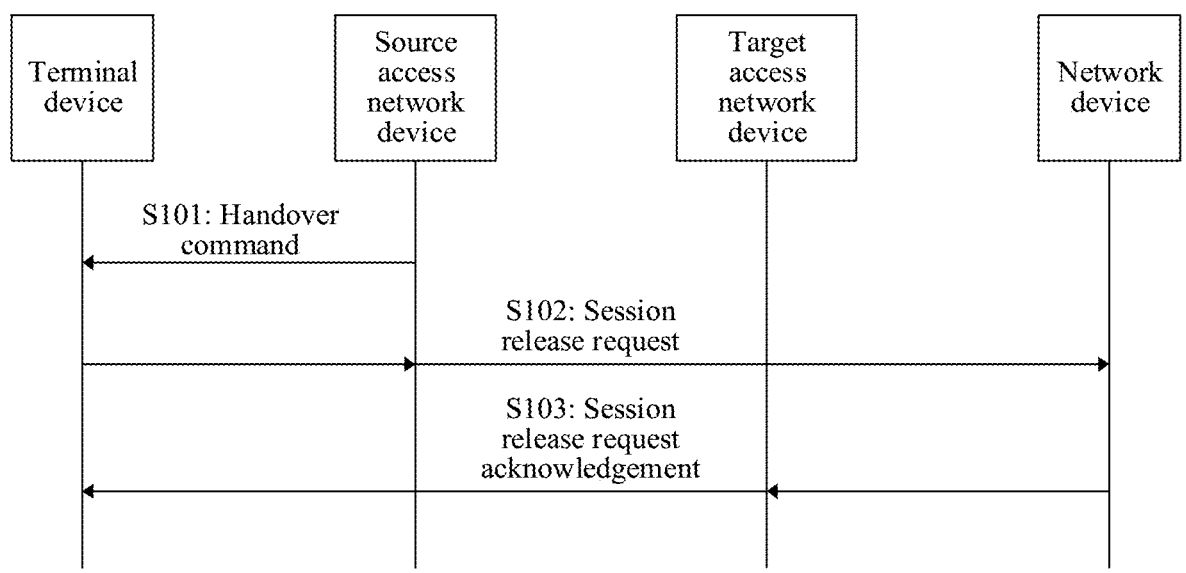
FIG. 4 is a schematic interactive flowchart of a communication method according to an embodiment of the present application.

FIG. 4 is a schematic interactive flowchart of a communication method according to an embodiment of the present application. The method may include the following operations:

S101: A source access network device sends a handover command to a terminal device, where the handover command includes an identifier of a target cell. The terminal device receives the handover command from the source access network device.

S102: The terminal device sends a session release request to a network device, where the session release request is used to request to release a session performed by the terminal device on at least one network slice in a source cell, the at least one network slice is not supported by the target cell, and the session release request includes the identifier of the target cell. The network device receives the session release request from the terminal device.

S103: The network device sends a session release request acknowledgement to the terminal device. The terminal device receives the session release request acknowledgement from the network device.

Handover between cells is invisible to the network device, and a base station does not know which sessions of UE are being performed. Therefore, a source base station sends the handover command to the terminal device, and the terminal device sends the session release request to the network device.

The terminal device may learn, before handover, the slices supported by the target cell, and may include, in the session release request, an identifier of the session performed on the at least one network slice. The network device may directly send, based on the identifier of the session, the session release request acknowledgement. That is, before S103, the method may further include an operation: determining, by the network device, to release a session corresponding to the identifier of the session performed on the at least one network slice. Alternatively, the terminal device may not learn, before handover, the slices supported by the target cell, then the source base station needs to add slice-related information of the target cell to the handover command. The slice-related information may include an indication of whether the target cell supports the network slice in the source cell, or a network slice identifier supported by the target cell, or a network slice identifier that is not supported by the target cell. That is, before S103, the method may further include an operation: comparing, by the network device based on the identifier of the target cell, a network slice supported by the source cell and a network slice supported by the target cell, to determine the at least one network slice that is not supported by the target cell; and determining, by the network device, to release the session performed on the at least one network slice. The following are descriptions based on different scenarios.

In one embodiment, the terminal device learns, before handover, the slices supported by the target cell. For example, the terminal device pre-stores slice information of adjacent cells. The terminal device sends a session release request to the network device. For an occasion of sending the session release request, in one manner, the terminal device sends a session release request to the network device after receiving the handover command sent by the source cell base station, then performs a subsequent step (initiates random access in the target cell) of handover, and in another manner, the terminal device first switches to the target cell (completes a random access process) after receiving the handover command sent by the source cell base station, then sends the session release request to the network device. The session release request may be directly sent to the network device by the target cell (a new service cell), or may be forwarded to an original service cell by the target cell (a current service cell) and then sent to the network device.

It should be noted that the session release request is a non-access stratum (NAS) message, and is transmitted to the base station by using an RRC message. That is, the RRC message includes the session release request, and the base station obtains the session release request from the RRC message and forwards the session release request to a core network.

The session release request includes an identifier of the target cell. In addition, the session release request may not include a specific session ID (or session list). The network device determines which sessions to release. One network slice may correspond to one or more PDU sessions, and each session has an ID for identification. In one embodiment, an SMF compares a slice corresponding to a session currently performed by the terminal device with a slice supported by the target cell, to determine the slices that are not supported by the target cell, to release sessions corresponding to these slices. In this case, IDs of the specific sessions to be released are sent to the terminal device with the session release request acknowledgement. Alternatively, the session release request may further include specific session IDs. The SMF releases sessions corresponding to these session IDs. In this case, released-session IDs may be or may not be added to the session release request acknowledgement.

The session release request acknowledgement (session release request Ack) that the network device returns to the terminal device is sent by a target cell base station to the terminal device through the RRC message after the terminal device accesses the target cell base station. That is, the RRC message sent to the terminal device by the target cell base station includes the session release request acknowledgement.

In addition, the RRC message carrying the session release request may be an RRC connection release request. The RRC message may further include a session release reason, and the reason is used to indicate that a PDU session is released because a target cell slice is unavailable. For example, the reason may be a failure error code, or an internal reason such as UEM_UECNT_REL_TGT_SLICE_UNAVAILABLE, or may be a value in a cause value variable. The reason may affect a subsequent terminal device behavior. For example, when reselecting a cell, the terminal device avoids the target cell, or the reason is used by an operator for later network maintenance and optimization. In addition, another RRC message of interaction between the base station and the terminal device, for example, an RRC connection release command and an RRC connection reconfiguration command that are sent to the terminal device by a target base station, may further carry the session release reason.

In one embodiment, by enabling the terminal device to request, after receiving the handover command, the network device to release a session, the session corresponding to the slice that is not supported by the target cell is quickly released without affecting a session on another slice supported by the target cell.

In one embodiment, the terminal device does not learn, before handover, the slices supported by the target cell. Because the base station learns of a slice supported by an adjacent cell, the handover command sent by the source cell base station to the terminal device includes the slice-related information. The slice-related information may be: an indicator, indicating whether a target cell handover supports all current slices; or a slice list that is included in the handover command and supported by the target cell; or a slice list that is included in the handover command and not supported by the target cell.

For an occasion of sending the session release request, in one manner, the terminal device sends, after receiving a handover command, a session release request to the network device based on the handover command, then performs handover. The network device determines which slices are not supported by adjacent cells, and determines which PDU sessions to release. Alternatively, a session release request is sent to the network device, and which PDU sessions (for example, one list includes PDU session IDs) need to be released is indicated, then handover is performed; and in another manner, the terminal device first switches to the target cell (completes a random access process) after receiving the handover command sent by the source cell base station, then sends the session release request to the network device.

The session release request may be directly sent to the network device by the target cell (a new service cell), or may be forwarded to an original service cell by the target cell (a current service cell) and then sent to the network device.

The session release request acknowledgement that the network device returns to the terminal device is sent by a target cell base station to the terminal device through the RRC message after the terminal device accesses the target cell base station. That is, the RRC message includes the session release request acknowledgement.

Similarly, a session release reason is added to an RRC interaction message, such as an RRC connection release request, an RRC connection release command and an RRC connection reconfiguration command, between the terminal device and the base station.

In one embodiment, by including the slice-related information in the handover command and enabling the terminal device to request, after receiving the handover command, the network device to release a PDU session, the session corresponding to the slice that is not supported by the target cell is quickly released without affecting a session on another slice supported by the target cell.

In one embodiment, the session release request further includes an identifier of the session performed on the at least one network slice and/or an identifier of the at least one network slice.

After receiving the handover command of the source base station or switching to the target cell, the terminal device may further send, based on slice availability of the target cell, the session release request after a period of time. That is, after S101, the method further includes: starting, by the terminal device, a timer. Operation S102 includes: sending, by the terminal device when the timer expires, the session release request to the network device. Detailed descriptions are as follows:

In one embodiment, the terminal device finds, after switching to a new cell (or when the handover command is delivered), that some slice services are not supported by the new cell. In this case, a timer is started inside the terminal device. Alternatively, the timer is started after the target cell completes random access. When the timer expires, the terminal device sends one or more PDU session release requests corresponding to these slices to the network device. After receiving the requests, the network device sends PDU session release acknowledgements to the terminal device, and the terminal device releases the corresponding PDU sessions. A process of sending the session release requests by the terminal device and a process of sending the session release request acknowledgements by the network device are the same as those in the foregoing implementations, and details are not described herein again.

In one embodiment, the terminal device starts, based on the target cell slice availability, the timer after handover, and when the timer expires, the terminal device can request the network device to release a PDU session, so that the session corresponding to the slice that is not supported by the target cell is quickly released without affecting a session on another slice supported by the target cell.

According to a communication method provided in this embodiment of the present application, when the terminal device switches to the target cell, by requesting the network device to release a session corresponding to a network slice that is not supported by the target cell, the session corresponding to the network slice that is not supported can be quickly released, and a network resource is saved while a session corresponding to a network slice supported by the target cell is enabled to be continued.

Figure 5:
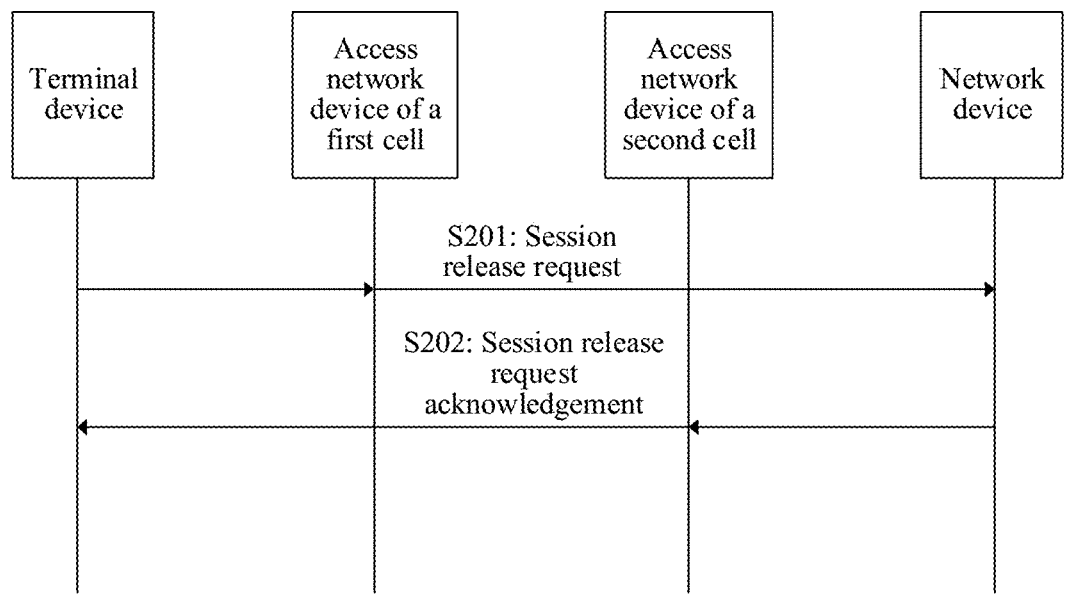
FIG. 5 is a schematic interactive flowchart of another communication method according to an embodiment of the present application.

FIG. 5 is a schematic interactive flowchart of another communication method according to an embodiment of the present application. The method may include the following operations:

S201: A terminal device sends, after a first cell is switched into a secondary cell and a second cell is switched into a primary cell or after the terminal device receives a connection release command from the second cell, a session release request to a network device, where the session release request is used to request to release a session performed by the terminal device on at least one network slice in the first cell, the at least one network slice is not supported by the second cell, the session release request includes an identifier of the second cell, and the terminal device is connected to both the first cell and the second cell. The network device receives the session release request sent by the terminal device.

S202: The network device sends a session release request acknowledgement to the terminal device. The terminal device receives the session release request acknowledgement from the network device.

Figure 6:
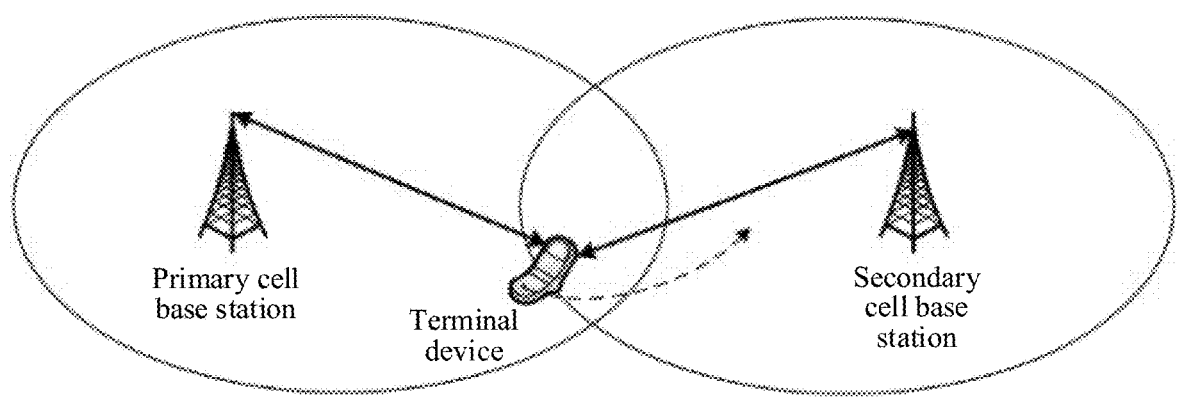
FIG. 6 is a schematic diagram of a double connection scenario of a terminal device.

This embodiment relates to a double connection scenario. FIG. 6 is a schematic diagram of a double connection scenario of a terminal device. Double connection is a method in which the terminal device simultaneously maintains, in a process of moving from one cell to another cell, two links between the terminal device and two base station cells to implement zero-millisecond interruption of user data. In FIG. 6, MgNB is a primary cell base station (that is, a first cell), and SgNB is a secondary cell base station (that is, a second cell). As the terminal device moves towards a secondary cell, role change is applied to the base stations of two cells, and in one embodiment, the original primary cell base station transforms into a secondary cell base station, and the original secondary cell base station transforms into a new primary cell base station to work. As the terminal device moves farther, a connection of the secondary cell base station (the original primary cell base station) is released, to complete the handover process.

Regardless of whether the terminal device learns of, in advance, the slices supported by the target cell, after establishing double connection, the terminal device certainly obtains the slice-related information of the secondary cell (base stations learn of the slices supported by each other, and when adding the target cell as the secondary cell (when establishing a connection), the terminal device can learn of the slices supported by the cell; or when the target cell is added as the secondary cell, the primary cell base station notifies, in the RRC message, the terminal device of the slices supported by the secondary cell). Because a link between the terminal device and the original primary cell base station is maintained in a handover process, a PDU session corresponding to an original slice service should not be released temporarily.

After roles of base stations are changed, or after the new primary cell base station (the original secondary cell base station) sends a secondary cell base station (the original primary cell base station) connection release command to the terminal device, the terminal device sends a NAS message to the network device before a connection between the terminal device and the original primary cell is released, and initiates a PDU session release request related to a slice that is not supported by the new primary cell. The session release request includes at least one of the following identifiers: an identifier of the new primary cell, an identifier of the session performed on the at least one network slice and an identifier of the at least one network slice.

Figure 7A:
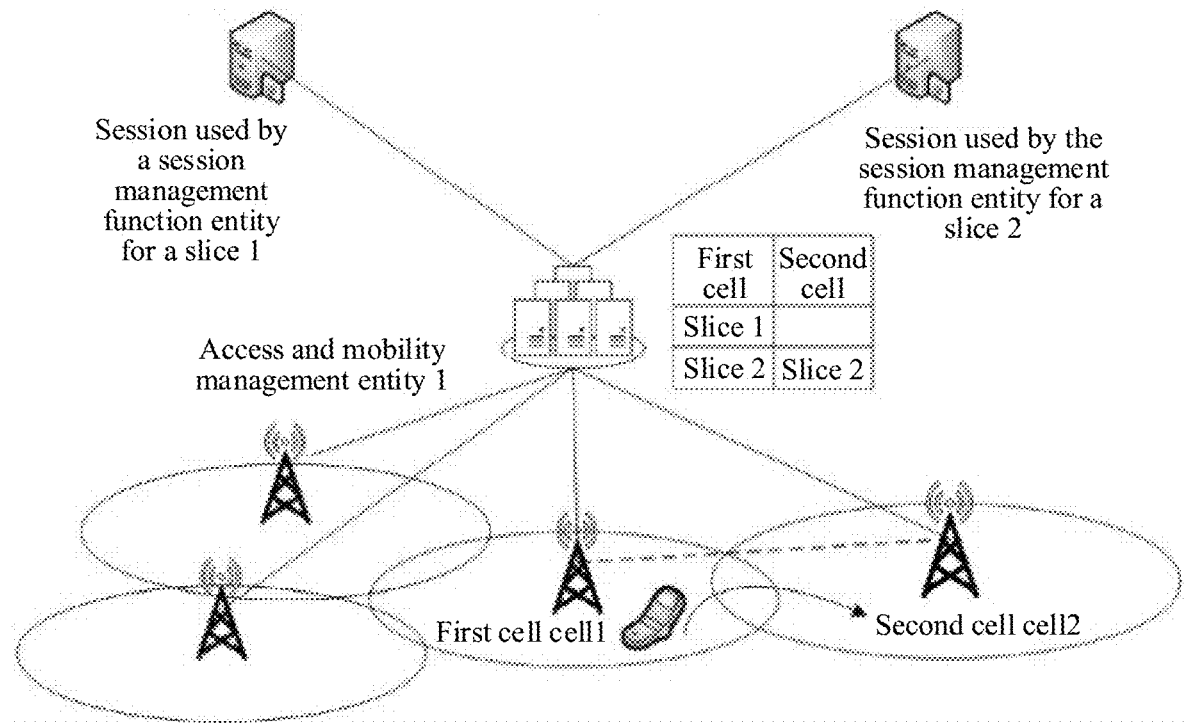
FIG. 7a and FIG. 7b are schematic diagrams of an example of a network connection.
Figure 7B:
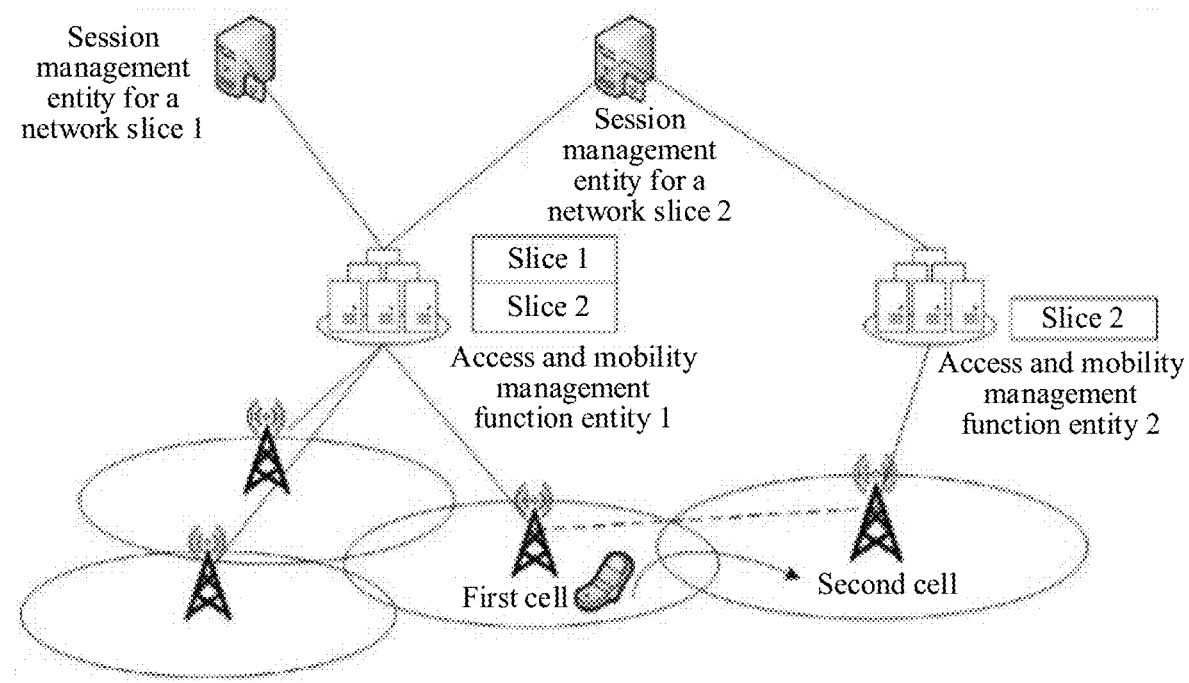

FIG. 7a is a schematic diagram of a network connection. If the primary cell base station and the secondary cell base station are connected to a same AMF, the session release request may be sent to the AMF by the original primary cell base station (the current secondary cell base station) or forwarded to the AMF by the new primary cell base station (the original secondary cell base station). FIG. 7b is a schematic diagram of another network connection. If the primary cell base station and the secondary cell base station are connected to different AMFs, the session release request may be sent to the AMF by the original primary cell base station (the current secondary cell base station), or forwarded to the original primary cell base station (the current secondary cell base station) by the new primary cell base station (the original secondary cell base station) and then sent to the AMF. S201 includes: sending, by the terminal device, the session release request to an AMF through an access network device of the first cell. The access network device of the first cell receives the session release request from the terminal device, and sends the session release request of the terminal device to the AMF. Alternatively, S201 includes: sending, by the terminal device, the session release request to an AMF through an access network device of the second cell, where the access network device of the first cell and the access network device of the second cell are connected to the same AMF; and receiving, by the access network device of the second cell, the session release request from the terminal device, and sending the session release request of the terminal device to the AMF. Alternatively, S201 includes: sending, by the terminal device, the session release request to an access network device of the first cell through an access network device of the second cell, where the access network device of the first cell and the access network device of the second cell are connected to different AMFs. The access network device of the first cell receives the session release request that is from the terminal device and that is forwarded by the access network device of the second cell, and sends the session release request to the AMF.

After receiving the request, the network device makes a judgment and sends a PDU session release acknowledgement to the terminal device. In one embodiment, before S202, the method further includes the following operations: comparing, by the network device based on the identifier of the second cell, a network slice supported by the first cell with a network slice supported by the second cell, to determine the at least one network slice that is supported by the first cell and is not supported by the second cell; and determining, by the network device, to release the session performed on the at least one network slice. The session release request acknowledgement that the network device returns to the terminal device is sent by a target cell base station to the terminal device through the RRC message after the terminal device accesses the target cell base station. That is, the RRC message sent to the terminal device by the target cell base station includes the session release request acknowledgement.

In addition, the RRC message carrying the session release request may be an RRC connection release request. The RRC message may further include a session release reason, and the reason is used to indicate that a PDU session is released because a target cell slice is unavailable. For example, the reason may be a failure error code, or an internal reason such as UEM_UECNT_REL_TGT_SLICE_UNAVAILABLE, or may be a value in a cause value variable. The reason may affect a subsequent terminal device behavior. For example, when reselecting a cell, the terminal device avoids the target cell, or the reason is used by an operator for later network maintenance and optimization. In addition, another RRC message of interaction between the base station and the terminal device, for example, an RRC connection release command and an RRC connection reconfiguration command that are sent to the terminal device by a target base station may further carry the session release reason.

According to a communication method provided in this embodiment of the present application, when the terminal device is connected to the new primary cell, by requesting the network device to release a session corresponding to a network slice that is not supported by the new primary cell and to keep a session corresponding to a network slice that is supported by the new primary cell, the session corresponding to the network slice that is not supported can be quickly released, and a network resource is saved while the session corresponding to the network slice supported by the new primary cell is enabled to be continued.

Figure 8:
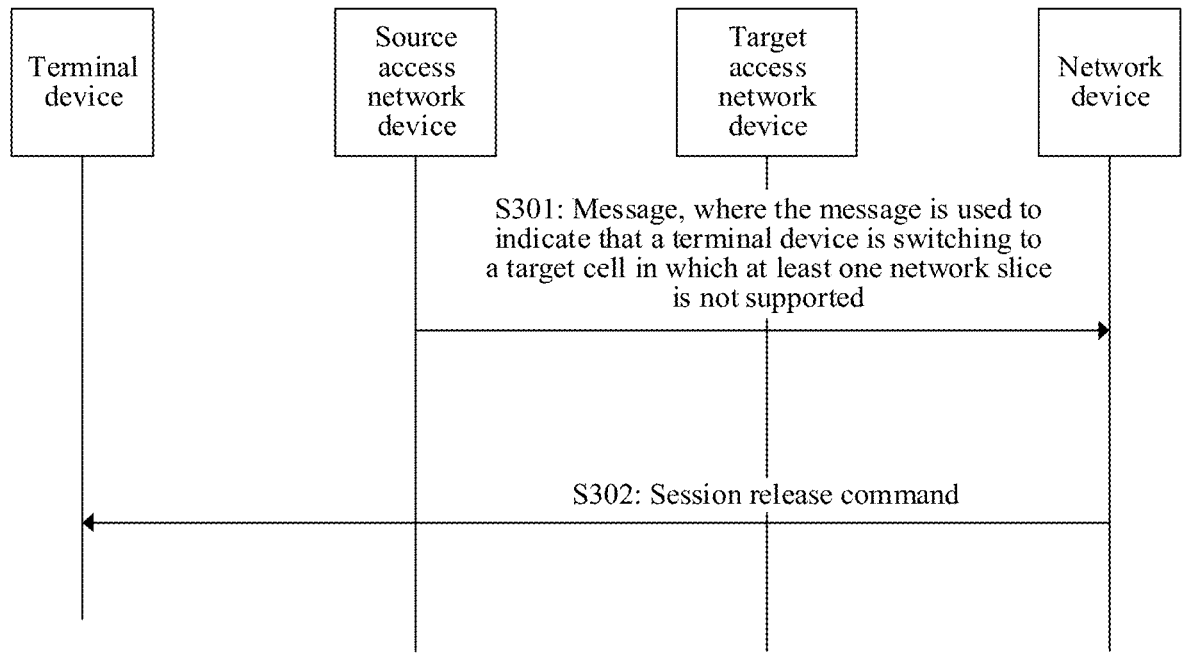
FIG. 8 is a schematic interactive flowchart of still another communication method according to an embodiment of the present application.

FIG. 8 is a schematic interactive flowchart of still another communication method according to an embodiment of the present application. The method may include the following operations:

S301: A source access network device sends a message to a network device, where the message is used to indicate that a terminal device is switching to a target cell in which at least one network slice is not supported, and the message includes an identifier of the target cell. The network device receives the message from the source access network device.

S302: The network device sends a session release command to the terminal device, where the session release command is used to instruct the terminal device to release a session performed on the at least one network slice. The terminal device receives the session release command from the network device.

Because the source cell base station learns of the slice services supported by adjacent cells and determines a time when the terminal device performs handover, the source cell base station sends, to the network device after sending the handover command to the terminal device (or after a handover trigger condition is satisfied), a message indication: the terminal device is switching to a cell that does not support a (some) slice(s). The message may include a target cell ID and network slice selection assistance information (NSSAI).

After receiving the message, the network device determines which PDU sessions to release, that is, after S301 and before S302, the method further includes the following operations: comparing, by the network device based on the identifier of the target cell, a network slice supported by the source cell with a network slice supported by the target cell, to determine the at least one network slice that is supported by the source cell and is not supported by the target cell, and determining, by the network device, to release the session performed on the at least one network slice. Subsequently, based on a target cell ID carried in the message sent by the source cell base station, a PDU session release command is sent to the terminal device through the target cell. The session release command is a NAS message carried by an RRC message.

After receiving the PDU session release command, the terminal device releases a related PDU session. A PDU session release acknowledgement (PDU session release Ack) may further be sent to the network device.

In one embodiment, the session release request further includes an identifier of the session performed on the at least one network slice and/or an identifier of the at least one network slice.

In addition, the RRC message carrying the session release request may be an RRC connection release request. The RRC message may further include a session release reason, and the reason is used to indicate that a PDU session is released because a target cell slice is unavailable. For example, the reason may be a failure error code, or an internal reason such as UEM_UECNT_REL_TGT_SLICE_UNAVAILABLE, or may be a value in a cause value variable. The reason may affect a subsequent terminal device behavior. For example, when reselecting a cell, the terminal device avoids the target cell, or the reason is used by an operator for later network maintenance and optimization. In addition, another RRC message of interaction between the base station and the terminal device, for example, an RRC connection release command and an RRC connection reconfiguration command that are sent to the terminal device by a target base station may further carry the session release reason.

According to a communication method provided in this embodiment of the present application, the source base station indicates, to the network device, that the terminal device will perform handover soon, and the network device makes a judgment and initiates a release process of the related PDU session, so that the session corresponding to a network slice that is not supported by the target cell can be quickly released, and a network resource can be saved while a session corresponding to a network slice supported by the target cell is enabled to be continued.

In another embodiment, the source cell base station directly initiates a session release request to the network device. Because the source cell base station learns of the slice services supported by adjacent cells and determines a time when the terminal device performs handover, the source cell base station sends, after sending the handover command to the terminal device, the PDU session release request to the network device, and a reason that a user is switching to a cell (including a target cell ID and slice-related information) that does not support a (some) slice(s) (note: the PDU session release request initiated by the source cell base station cannot include a specific PDU ID).

The network device determines, after receiving the PDU session release request, which PDU sessions to release. In addition, based on a target cell ID carried in an indication sent by the source cell base station, a PDU session release command is sent to a user through the target cell.

The terminal device releases the related PDU session after receiving the PDU session release command, and sends a PDU session release acknowledgement (PDU session release Ack) to the network device by using an RRC message sent to a target cell base station.

In this embodiment, because the source base station determines when to perform handover, by enabling the source cell base station to initiate the PDU session release request to the network device, a request for a quick PDU session release is implemented.

In another embodiment, the terminal device finds, after switching to a new cell, that some slice services are not supported by the new cell, and in this case, a timer is started inside the terminal device. Alternatively, a user starts a timer when the handover command is delivered. When the timer expires, a PDU session, of the terminal device, corresponding to a slice that is not supported by the new cell is automatically released.

In this embodiment, the automatic release of the PDU session when the timer expires is implemented by adding a timer and starting the timer when a new cell slice is unavailable after handover to a new cell.

Figure 9:
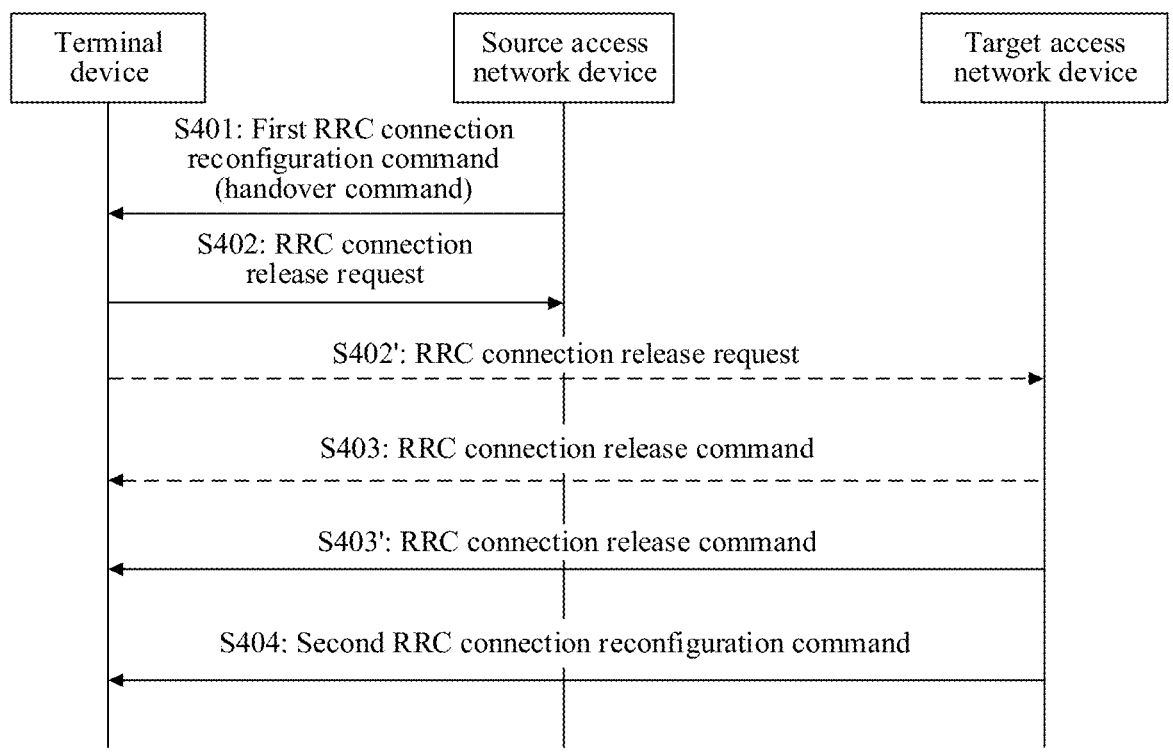
FIG. 9 is a schematic interactive flowchart of still another communication method according to an embodiment of the present application.

FIG. 9 is a schematic interactive flowchart of still another communication method according to an embodiment of the present application. The method may include the following operations:

S401: A source access network device sends a first RRC connection reconfiguration command, that is, a handover command to a terminal device. The terminal device receives the handover command.

S402: The terminal device sends a radio resource control RRC connection release request to the source access network device, where the RRC connection release request includes a session release request, the session release request is used to request a network device to release a session performed on at least one network slice in a source cell, the at least one network slice is not supported by a target cell, and the session release request includes an identifier of the target cell. Alternatively, S402': The terminal device sends the RRC connection release request to a target access network device. The source access network device or the target access network device receives the RRC connection release request from the terminal device.

S403: The target access network device sends an RRC connection release command to the terminal device. The terminal device receives the RRC connection release command from the access network device. The RRC connection release command includes the session release request acknowledgement from the network device. Alternatively, S403': The source access network device sends an RRC connection release command to the terminal device.

S404: The target access network device sends a second RRC connection reconfiguration command to the terminal device. The terminal device receives the second RRC connection reconfiguration command.

In a process of switching a cell or switching a connection of a primary cell, an interaction of some RRC messages may exist among the terminal device, a source cell base station (an original primary cell base station) and a target cell base station (an original secondary cell base station). These RRC messages include the first RRC connection reconfiguration command, the RRC connection release request, the RRC connection release command and/or the second RRC connection reconfiguration command. In this embodiment, these RRC messages include a session release reason. The reason/a value of the reason is used to indicate that a reason for a PDU session release is that a target cell base station slice is unavailable (target cell/gNB slice unavailable). For example, the reason may be a failure error code, or an internal reason such as UEM_UECNT_REL_TGT_SLICE_UNAVAILABLE, or may be a value in a cause value variable. The reason may affect a subsequent terminal device behavior. For example, when reselecting a cell, the terminal device avoids the target cell, or the reason is used by an operator for later network maintenance and optimization.

According to a communication method provided in this embodiment of the present application, a release reason is added to an RRC message of interaction between the terminal device and the access network device during handover, and the reason is used to indicate that a PDU session is released because a target cell slice is unavailable. The reason may affect a subsequent terminal device behavior. For example, when reselecting a cell, the terminal device avoids the target cell, or the reason is used by an operator for later network maintenance and optimization.

The methods in the embodiments of the present application are described above in detail, and apparatuses in embodiments of the present application are provided below.

Figure 10:
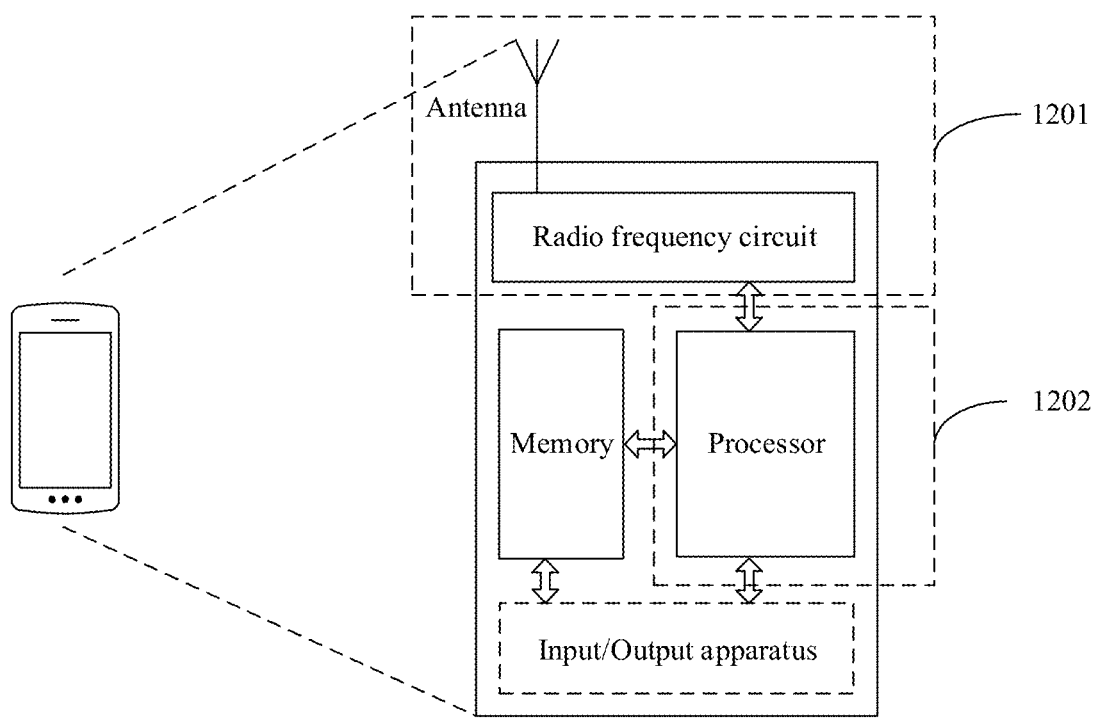
FIG. 10 is a schematic structural diagram of a simplified terminal device.

FIG. 10 is a schematic structural diagram of a simplified terminal device. For ease of understanding and convenience of figure illustration, an example in which a terminal device is a mobile phone is used in FIG. 10. As shown in FIG. 10, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data entered by a user and output data to the user. It should be noted that terminal devices of some types may not have the input/output apparatus.

When needing to send data, after performing baseband processing on to-be-sent data, the processor outputs a baseband signal to the radio frequency circuit; and the radio frequency circuit performs radio frequency processing on the baseband signal and then sends the radio frequency signal to outside in a form of an electromagnetic wave by using the antenna. When data is sent to the terminal device, the radio frequency circuit receives the radio frequency signal by using the antenna, converts the radio frequency signal into a baseband signal, and outputs the baseband signal to the processor. The processor converts the baseband signal into data, and processes the data. For ease of description, FIG. 10 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a receiving and sending function may be considered as a receiving unit and a sending unit of the terminal device (or may be collectively referred to as a transceiver unit), and the processor having a processing function may be considered as a processing unit of the terminal device. As shown in FIG. 10, the terminal device includes a transceiver unit 1201 and a processing unit 1202. The transceiver unit may include a receiving unit and a sending unit. The receiving unit may also be referred to as a receiver, a receiving device, a receiver circuit, and the like. The sending unit may also be referred to as a sender, a transmitter, a transmitting device, a transmitter circuit, and the like. The processing unit 1202 may also be referred to as a processor, a processing board, a processing module, a processing apparatus, and the like.

For example, in an embodiment, the receiving unit is configured to perform operation S101 and operation S103 of the embodiment shown in FIG. 4. The sending unit is configured to perform operation S102 of the embodiment shown in FIG. 4.

For another example, in another embodiment, the sending unit is configured to perform operation S201 of the embodiment shown in FIG. 5. The receiving unit is configured to perform operation S202 of the embodiment shown in FIG. 5.

For another example, in another embodiment, the receiving unit is configured to perform operation S302 of the embodiment shown in FIG. 8.

For another example, in another embodiment, the receiving unit is configured to perform operations S401, S403 and S404 of the embodiment shown in FIG. 9. The sending unit is configured to perform operation S402 of the embodiment shown in FIG. 9.

Figure 11:
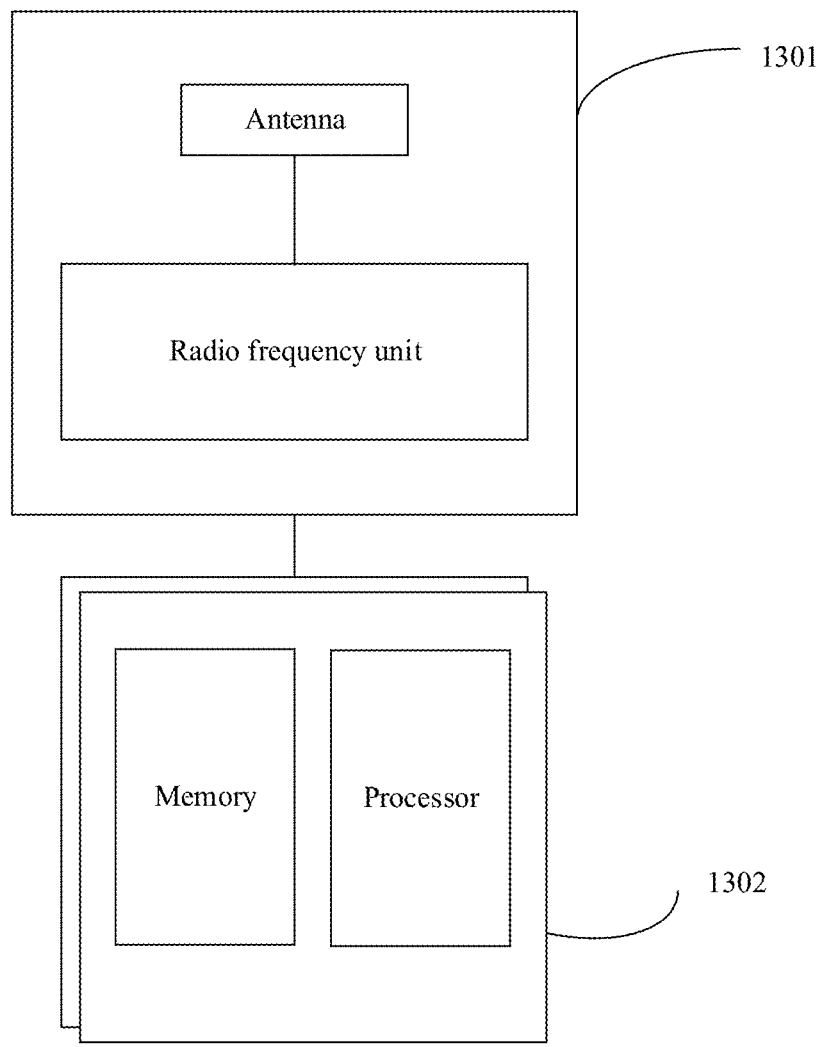
FIG. 11 is a schematic structural diagram of a simplified access network device.

FIG. 11 is a schematic structural diagram of a simplified access network device. The access network device includes a part 1301 and a part 1302. The part 1301 is a radio frequency signal receiving and sending and conversion part, the radio frequency signal receiving and sending and conversion part further includes a receiving unit and a sending unit. The receiving unit and the sending unit may further be collectively referred to as a transceiver unit. The radio frequency signal receiving and sending and conversion part is mainly configured to: receive and send a radio frequency signal and perform conversion between a radio frequency signal and a baseband signal. The part 1302 is mainly configured to perform baseband processing and access network device control, and the like. The receiving unit may also be referred to as a receiver, a receiving device, a receiver circuit, and the like. The sending unit may also be referred to as a sender, a transmitter, a transmitting device, a transmitter circuit, and the like. The part 1302 is usually a control center of the access network device, and may be usually referred to as a processing unit. For details, refer to the foregoing descriptions of the related parts.

The part 1302 may include one or more boards. Each board may include one or more processors and one or more memories, and the processor is configured to: read and execute a program in the memory, to implement a baseband processing function and control the access network device. If there are a plurality of boards, the boards may be interconnected to enhance a processing capability. In one embodiment, alternatively, the plurality of boards may share one or more processors, or the plurality of boards share one or more memories, or the plurality of boards simultaneously share one or more processors.

For example, in an embodiment, the sending unit is configured to perform operation S101 of the embodiment shown in FIG. 4.

For another example, in another embodiment, the sending unit is configured to perform operation S301 of the embodiment shown in FIG. 8.

For another example, in another embodiment, the sending unit is configured to perform operation S401 of the embodiment shown in FIG. 9, and the receiving unit is configured to perform operation S402 of the embodiment shown in FIG. 9.

For another example, in another embodiment, with development of system on chip (SoC for short) technologies, some or all of functions of the part 1302 and the part 1301 may be implemented by using the SoC technology such as an access network device function chip. The access network device function chip is integrated with devices such as a processor, a memory, and an antenna interface, a program of a function related to an access network device is stored in the memory, and the program is executed by the processor to implement the function related to the access network device. In one embodiment, the access network device function chip can also read a memory outside the chip to implement the function related to the access network device.

Figure 12:
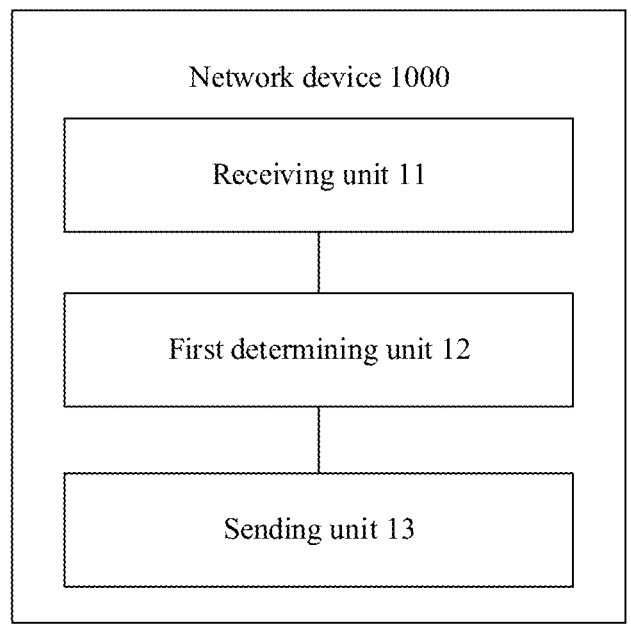
FIG. 12 is a schematic diagram of modules of a network device according to an embodiment of the present application.

FIG. 12 is a schematic diagram of modules of a network device according to an embodiment of the present application. The network device 1000 may include a receiving unit 11 and a sending unit 13, and may further include a first determining unit 12 or a second determining unit (not shown).

The receiving unit 11 is configured to receive a session release request from a terminal device, where the session release request is used to request to release a session performed by the terminal device on at least one network slice in a source cell, the at least one network slice is not supported by a target cell, and the session release request includes an identifier of the target cell.

The sending unit 13 is configured to send a session release request acknowledgement to the terminal device.

In one embodiment, the session release request includes an identifier of the session performed on the at least one network slice, and one network slice corresponds to at least one session.

The network device further includes the first determining unit 12 configured to determine to release a session corresponding to the identifier of the session performed on the at least one network slice.

In one embodiment, the network device further includes the second determining unit, configured to: compare, based on the identifier of the target cell, a network slice supported by the source cell with a network slice supported by the target cell, to determine the at least one network slice that is not supported by the target cell, and determine to release the session performed on the at least one network slice.

Figure 13:
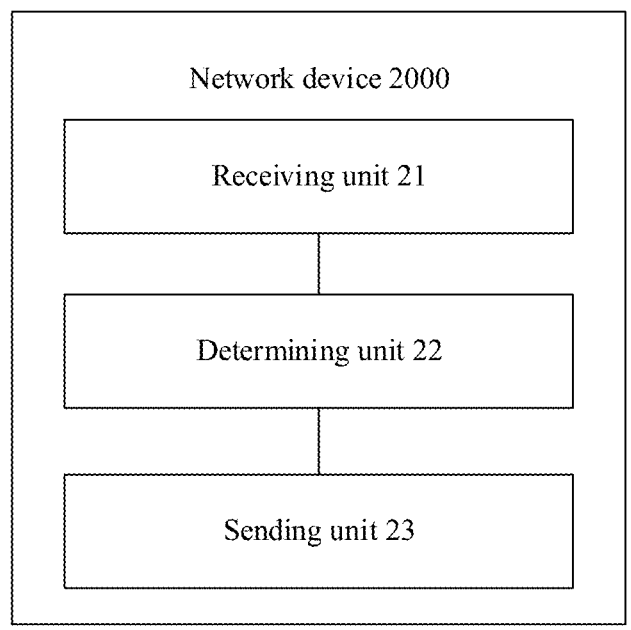
FIG. 13 is a schematic diagram of modules of another network device according to an embodiment of the present application.

FIG. 13 is a schematic diagram of modules of another network device according to an embodiment of the present application. The network device 2000 may include a receiving unit 21 and a sending unit 23, and may further include a determining unit 22.

The receiving unit 21 is configured to receive a session release request from a terminal device, where the session release request is used to request to release a session performed by the terminal device on at least one network slice in a first cell, the session release request includes an identifier of a second cell, and the terminal device is connected to both the first cell and the second cell.

The sending unit 23 is configured to send a session release request acknowledgement to the terminal device.

Further, the network device further includes the determining unit 22.

The determining unit 22 is configured to: compare, based on the identifier of the second cell, a network slice supported by the first cell with a network slice supported by the second cell, to determine the at least one network slice that is supported by the first cell and is not supported by the second cell, and determine to release the session performed on the at least one network slice.

Figure 14:
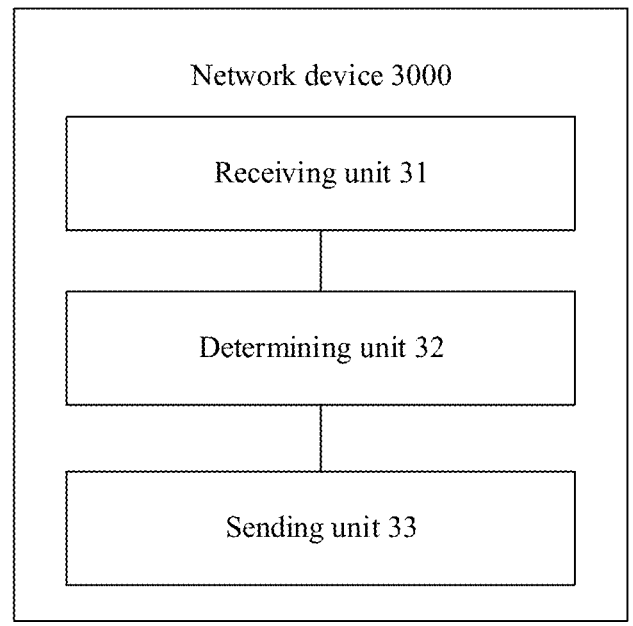
FIG. 14 is a schematic diagram of modules of still another network device according to an embodiment of the present application.

FIG. 14 is a schematic diagram of modules of another network device according to an embodiment of the present application. The network device 3000 may include a receiving unit 31 and a sending unit 33, and may further include a determining unit 32.

The receiving unit 31 is configured to receive a message from a source access network device, where the message is used to indicate that a terminal device is switching to a target cell in which at least one network slice is not supported, and the message includes an identifier of the target cell.

The sending unit 33 is configured to send a session release command to the terminal device, where the session release command is used to instruct the terminal device to release a session performed on the at least one network slice.

Further, the network device further includes the determining unit 32.

The determining unit 32 is configured to: compare, based on the identifier of the target cell, a network slice supported by the source cell with a network slice supported by the target cell, to determine the at least one network slice that is supported by the source cell and is not supported by the target cell, and determine to release the session performed on the at least one network slice.

The message further includes network slice information, and the network slice information includes at least one of the following information: a network slice identifier and network slice selection assistance information.

The session release command is included in a radio resource control RRC message, and the RRC message further includes a session release reason.

An embodiment of the present application further provides a network device. The network device may use the hardware architecture shown in FIG. 15. The network device 1500 may include a receiver 1501, a transmitter 1502, a memory 1503 and a processor 1504. The receiver 1501, the transmitter 1502, the memory 1503 and the processor 1504 are connected to each other by using a bus. A related function implemented by the sending unit 13 in FIG. 12, the sending unit 23 in FIG. 13 or the sending unit 33 in FIG. 14 may be implemented by the transmitter 1502. A related function implemented by the receiving unit 11 in FIG. 12, the receiving unit 21 in FIG. 13 or the receiving unit 31 in FIG. 14 may be implemented by the receiver 1501. A related function implemented by the first determining unit 12 or the second determining unit in FIG. 12, the determining unit 22 in FIG. 13 or the determining unit 32 in FIG. 14 may be implemented by one or more processors 1504.

The memory 1503 includes but is not limited to a RAM, a ROM, an EPROM, and a CD-ROM, and the memory is configured to store related instructions and data.

The receiver 1501 is configured to receive data and/or a signal, and the transmitter 1502 is configured to send data and/or a signal. The transmitter and the receiver may be independent devices, or may be an integrated device.

The processor 1504 may include one or more processors, for example, one or more CPUs. When the processor is one CPU, the CPU may be a single-core CPU, or may be a multi-core CPU.

For example, in an embodiment, the receiver 1501 is configured to perform operation S102 of the embodiment shown in FIG. 4, and the transmitter 1502 is configured to perform operation S103 of the embodiment shown in FIG. 4.

For another example, in another embodiment, the receiver 1501 is configured to perform operation S201 of the embodiment shown in FIG. 5, and the transmitter 1502 is configured to perform operation S202 of the embodiment shown in FIG. 5.

For another example, in another embodiment, the receiver 1501 is configured to perform operation S301 of the embodiment shown in FIG. 8, and the transmitter 1502 is configured to perform operation S302 of the embodiment shown in FIG. 8.

For an example, refer to descriptions of the foregoing method embodiments.

Figure 15:
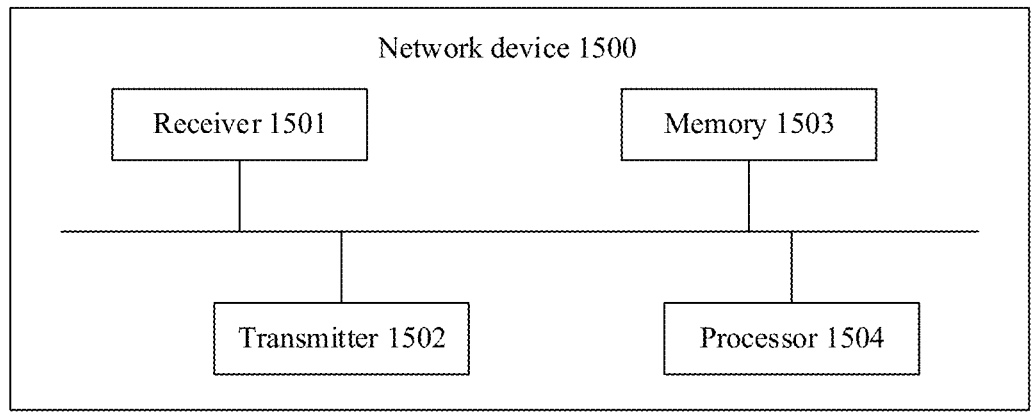
FIG. 15 is a schematic structural diagram of hardware of a network device according to an embodiment of the present application.

It may be understood that, FIG. 15 merely shows a simplified design of the network device. During actual application, the network device may further separately include another element, which includes but is not limited to any quantity of transceivers, processors, controllers, memories and the like, and network devices that can implement the embodiments of the present application shall all fall within the protection scope of the present application.

An embodiment of the present application further provides a computer storage medium, configured to store a computer software instruction used by a communications apparatus. The computer storage medium includes a program designed to execute the foregoing method embodiments.

An embodiment of the present application further provides a computer program product, configured to store a computer software instruction used by a communications apparatus. The computer program product includes a program designed to execute the foregoing method embodiments.

In the embodiments of this application, function modules of the terminal device or the network device may be divided based on the foregoing method examples. For example, function modules may be divided corresponding to functions, or two or more functions may be integrated into one processing module. The integrated module may be implemented in a form of hardware, or may be implemented in a form of a software function module. It should be noted that, in this embodiment of this application, module division is exemplary, and is merely a logical function division. In actual implementation, another division manner may be used. An example in which function modules are divided based on functions is used hereinafter for description.

For explanations and beneficial effects of related content in any of the foregoing provided communications apparatuses, refer to corresponding method embodiments provided above, and details are not described herein again. A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions (program or code). When the computer program instructions are loaded and executed on the computer, the procedure or functions according to the embodiments of the present application are all or partially generated. The computer may be a general-purpose computer, a dedicated computer, a computer network, or other programmable apparatuses. The computer instruction may be stored in a computer readable storage medium, or may be transmitted by using the computer readable storage medium. For example, the computer instructions may be transmitted from a website, computer, server, or data center to another website, computer, server, or data center in a wired (for example, a coaxial cable, an optical fiber, or a digital subscriber line DSL) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a read-only memory (ROM), a random access memory (RAM), a magnetic disk, or an optical disc.

What is claimed is:

1. A communication method comprising:
receiving, by a terminal device, a handover command from a source access network device, wherein the handover command comprises an identifier of a target cell;
sending, by the terminal device, a session release request to an access and mobility management function (AMF) network device that performs access and mobility management functions, wherein the session release request is used to request to release a session performed by the terminal device on at least one network slice in a source cell, and the session release request comprises the identifier of the target cell, wherein the handover command comprises an indication of whether the target cell supports the at least one network slice in the source cell, or the handover command comprises a network slice identifier supported by the target cell, or the handover command comprises a network slice identifier not supported by the target cell, wherein the session release request is forwarded to a session management function (SMF) network device that performs session management functions for the terminal device;
sending, by the SMF network device, a session release request acknowledgement to the terminal device, wherein, before the sending of the session release request acknowledgement to the terminal device: comparing, by the SMF, based on the identifier of the target cell, a network slice supported by the source cell with a network slice supported by the target cell, to determine the at least one network slice not supported by the target cell; and determining, by the SMF, to release a session performed on the at least one network slice; and
receiving, by the terminal device, the session release request acknowledgement from the SMF network device.

2. The method according to claim 1, wherein the session release request comprises an identifier of the session performed on the at least one network slice and one network slice corresponds to at least one session.

3. The method according to claim 1, wherein, after the receiving, by a terminal device, a handover command from a source access network device, the method further comprises:
starting, by the terminal device, a timer; and
the sending, by the terminal device, a session release request to an AMF network device comprises:
sending, by the terminal device, when the timer expires, the session release request to the AMF network device.

4. A communication method comprising:
receiving, by an access and mobility management function (AMF) network device that performs access and mobility management functions, a session release request from a terminal device, the session release request message being forwarded to a session management function (SMF) network device that performs session management functions for the terminal device, wherein the session release request is used to request to release a session performed by the terminal device on at least one network slice in a source cell, and the session release request comprises an identifier of a target cell; and
sending, by the SMF network device, a session release request acknowledgement to the terminal device, wherein, before the sending of the session release request acknowledgement to the terminal device:
comparing, by the SMF, based on the identifier of the target cell, a network slice supported by the source cell with a network slice supported by the target cell, to determine the at least one network slice not supported by the target cell; and
determining, by the SMF, to release a session performed on the at least one network slice.

5. The method according to claim 4, wherein the session release request comprises an identifier of the session performed on the at least one network slice, and one network slice corresponds to at least one session; and
before the sending, by the SMF network device, a session release request acknowledgement to the terminal device, the method further comprises:
determining, by the SMF network device, to release a session corresponding to the identifier of the session performed on the at least one network slice.

6. A terminal device comprising:
a receiving unit configured to receive a handover command from a source access network device, wherein the handover command comprises an identifier of a target cell; and
a sending unit configured to send a session release request to an access and mobility management function (AMF) network device that performs access and mobility management functions, wherein the session release request is used to request to release a session performed by the terminal device on at least one network slice in a source cell, and the session release request comprises the identifier of the target cell, wherein the handover command comprises an indication of whether the target cell supports the at least one network slice in the source cell, or the handover command comprises a network slice identifier supported by the target cell, or the handover command comprises a network slice identifier not supported by the target cell, wherein, the session release request is forwarded to a session management function (SMF) network device that performs session management functions for the terminal device, wherein,
the receiving unit is further configured to receive a session release request acknowledgement from the SMF network device, wherein, before the sending of the session release request acknowledgement to the terminal device, the SMF: compares, based on the identifier of the target cell, a network slice supported by the source cell with a network slice supported by the target cell, to determine the at least one network slice not supported by the target cell; and determines to release a session performed on the at least one network slice.

7. The terminal device according to claim 6, wherein the session release request comprises an identifier of the session performed on the at least one network slice, and one network slice corresponds to at least one session.

8. The terminal device according to claim 6, further comprising:
    a timing unit, configured to start a timer, wherein,
    the sending unit is configured to send, when the timer expires, the session release request to the AMF network device.

\* \* \* \* \*